(12) United States Patent
Nishihara et al.

(10) Patent No.: US 12,347,865 B2
(45) Date of Patent: Jul. 1, 2025

(54) CARBON MATERIAL, CATHODE AND ANODE FOR POWER STORAGE DEVICE WITH THE SAME, AND POWER STORAGE DEVICE WITH THE SAME

(71) Applicant: 3DC Inc., Miyagi (JP)

(72) Inventors: Hirotomo Nishihara, Miyagi (JP); Zheng-Ze Pan, Miyagi (JP); Takuma Kuroda, Miyagi (JP); Atsuo Omaru, Miyagi (JP)

(73) Assignee: 3DC INC., Sendai (JP)

( * ) Notice: Subject to any disclaimer, the term of this patent is extended or adjusted under 35 U.S.C. 154(b) by 0 days.

(21) Appl. No.: 18/294,844

(22) PCT Filed: Jul. 25, 2023

(86) PCT No.: PCT/JP2023/027285
§ 371 (c)(1),
(2) Date: Feb. 2, 2024

(87) PCT Pub. No.: WO2024/048142
PCT Pub. Date: Mar. 7, 2024

(65) Prior Publication Data
US 2024/0274825 A1    Aug. 15, 2024

(30) Foreign Application Priority Data
Aug. 30, 2022    (JP) ................................. 2022-137188

(51) Int. Cl.
*H01M 4/62*    (2006.01)
*C01B 32/182*    (2017.01)

(52) U.S. Cl.
CPC ........... *H01M 4/625* (2013.01); *C01B 32/182* (2017.08); *C01P 2006/12* (2013.01);
(Continued)

(58) Field of Classification Search
CPC .... H01M 4/625; C01B 32/194; C01B 32/184; C01B 32/186; C01B 32/198;
(Continued)

(56) References Cited

U.S. PATENT DOCUMENTS

| | | | | |
|---|---|---|---|---|
| 2015/0194674 | A1* | 7/2015 | Hardman | H01M 4/1393 427/122 |
| 2017/0170477 | A1* | 6/2017 | Sakshaug | H01M 4/587 |

(Continued)

FOREIGN PATENT DOCUMENTS

| | | |
|---|---|---|
| JP | 2003048707 A | 2/2003 |
| JP | 2012211069 A | 11/2012 |

(Continued)

OTHER PUBLICATIONS

Translation to English for JP-2015164889-A via Search. accessed May 29, 2024 (Year: 2015).*

(Continued)

*Primary Examiner* — Maria V Ewald
*Assistant Examiner* — Ethan Weydemeyer
(74) *Attorney, Agent, or Firm* — Panitch Schwarze Belisario & Nadel LLP

(57) ABSTRACT

An object is to provide a carbon material that can achieve high electrical conductivity or durability together with flexibility against compression and to provide a power storage device containing the carbon material inside an electrode. Provided are a carbon material having a bulk modulus K that is less than or equal to 2 GPa and an average graphene domain size L that is greater than or equal to 50 nm, a cathode for a power storage device and an anode for a power storage device in which the carbon material is used as a conductive agent, and a power storage device including a cathode and/or an anode including the carbon material as a conductive agent.

10 Claims, 25 Drawing Sheets

(52) U.S. Cl.
CPC ...... *C01P 2006/14* (2013.01); *C01P 2006/16* (2013.01); *C01P 2006/40* (2013.01)

(58) Field of Classification Search
CPC ... C01B 32/182; C01B 32/05; C01B 2204/04; C01B 2204/32; C01B 32/15; C01B 32/195; C01B 32/168; C01B 2204/02; C01B 32/16; C01B 32/21; C01B 32/00; C01B 2204/20; C01B 2204/06; C01B 2006/12; C01B 2006/14; C01B 2006/16; C01B 2006/40
See application file for complete search history.

(56) References Cited

U.S. PATENT DOCUMENTS

| | | | |
|---|---|---|---|
| 2017/0237075 A1 | 8/2017 | Pedrós et al. | |
| 2017/0296982 A1* | 10/2017 | Swett | C23C 16/48 |
| 2023/0343522 A1* | 10/2023 | Nobumori | H01G 11/32 |
| 2024/0128455 A1* | 4/2024 | Zafiropoulos | H01M 4/386 |

FOREIGN PATENT DOCUMENTS

| | | | |
|---|---|---|---|
| JP | 2013199428 A | | 10/2013 |
| JP | 2015164889 A | * | 9/2015 |
| JP | 2017197424 A | | 11/2017 |
| JP | 2018501173 A | | 1/2018 |
| JP | 2019102711 A | * | 6/2019 |
| JP | 2020-140950 A | | 9/2020 |
| JP | 2021084819 A | * | 6/2021 |

OTHER PUBLICATIONS

Translation to English for JP-2019102711-A via Search. accessed May 29, 2024 (Year: 2019).*
Translation to English for JP-2021084819-A via espacenet. accessed May 29, 2024 (Year: 2021).*
Politano, A., Chiarello, G. Probing the Young's modulus and Poisson's ratio in graphene/metal interfaces and graphite: a comparative study. Nano Res. 8, 1847-1856 (2015). https://doi.org/10.1007/s12274-014-0691-9 (Year: 2015).*
International Search Report issued Sep. 26, 23 in PCT/JP2023/027285.
Written Opinion issued Sep. 26, 23 in PCT/JP2023/027285.
Takafumi Ishii et al., "A quantitative analysis of carbon edge sites and an estimation of graphene sheet size in high-temperature treated, non-porous carbons", Carbon, vol. 80, pp. 135-145 (2014); Cited in Specification.
Office Action issued Jun. 4, 2024 in JP Application No. 2024-510470, with English machine translation.

* cited by examiner

TYPE I

TYPE IV

▲×—EXAMPLE, ○●—COMPARATIVE EXAMPLE

▲×—EXAMPLE, ○●—COMPARATIVE EXAMPLE

CARBON MATERIAL, CATHODE AND ANODE FOR POWER STORAGE DEVICE WITH THE SAME, AND POWER STORAGE DEVICE WITH THE SAME

CROSS-REFERENCE TO RELATED APPLICATIONS

This application is a Section 371 of International Application No PCT/JP2023/027285, filed Jul. 25, 2023, which has not yet published, which claims priority under 35 U.S.C. § 119 (b) to Japanese Application No. 2022-137188 filed Aug. 30, 2022, the disclosures of each of which are incorporated herein by reference.

TECHNICAL FIELD

The present invention relates to a carbon material and a conductive agent with the same.

BACKGROUND ART

In recent years, efforts to achieve a sustainable society have attracted attention. In particular, research and development for seeking carbon neutral to reduce overall greenhouse gas emissions to zero has been actively made, and research on novel carbon materials for higher performance of power storage devices such as secondary batteries or electric double-layer capacitors (EDLC) is underway globally.

Carbon materials containing graphene are superior in thermal conductivity, electrical conductivity, and mechanical (tensile) strength and have been studied for various fields of applications, such as electronics, energy materials, and the like. Among other things, porous carbon materials have been intensively researched as electrodes and peripheral materials thereof for energy device use such as for batteries and capacitors because of its large specific surface area and in terms of as a reaction field of a catalyst or of electrical conductivity.

SUMMARY OF INVENTION

Technical Problem

Examples of prospective application of porous, flexible carbon materials having electrical conductivity may be, for example, lithium-ion batteries in which silicon is used for the anode. A phenomenon has been reported in which silicon particles of an active material of the anode expand in response to repetition of charge and discharge and the lifespan thereof decreases in the charge/discharge cycle characteristics of lithium-ion batteries. If such expansion of silicon particles in a micro perspective could be absorbed by compression of flexible particles, this would help to solve the above problem. However, there is a problem of lack of guidelines on parameters and design about the flexibility because of still insufficient knowledge on flexibility against compression.

Further, in the cathode that is another leading part of lithium-ion batteries, while a change in volume does not occur so much as the anode even after subjected to charging and discharging, a dimensional change of a crystal lattice undoubtedly occurs microscopically due to removal and insertion of lithium-ions. It is apparent that micro-motion caused by a dimensional change of hard crystal lattices in the cathode will eventually cause an increase in resistance of the electrode and affect the charge/discharge lifespan.

Furthermore, the range of use of lithium-ion batteries has expanded from power supplies for mobile devices to power supplies for electric vehicles (EV). Under such circumstances, countermeasures against impacts of mechanical stresses, which serve as a factor external to batteries, on an increase in the electrode resistance are still far from sufficient. Such impacts include an adverse effect on the battery lifespan caused by vehicle body vibration while an EV is traveling, for example. This is another major problem.

The present invention has been made in view of such circumstances and intends to provide a carbon material that can achieve high electrical conductivity or durability together with flexibility against compression received from a stress generated by macroscopical and/or microscopical mechanical vibration that may occur inside or outside a battery and to provide a power storage device accommodating the carbon material inside cathode and/or anode.

Solution to Problem

As a result of intensive research, the present inventors have found an index of bulk modulus K related to flexibility and found that a carbon material superior in flexibility against compression and electrical conductivity or durability can be realized when the bulk modulus K is less than or equal to 2 GPa and the average graphene domain size L is greater than or equal to 50 nm.

The present invention provides the following configuration in order to solve the problems described above.

(1) A carbon material having a bulk modulus K that is less than or equal to 2 GPa and an average graphene domain size L that is greater than or equal to 50 nm.
(2) The carbon material of (1) in which an average number of stacking layers n is one or greater and six or less.
(3) The carbon material of (1) or (2) in which a pore diameter d is greater than or equal to 5 nm and less than or equal to 65 nm.
(4) The carbon material of any one of (1) to (3) in which a nitrogen content N in graphene domain is greater than or equal to 0 wt % and less than or equal to 10 wt %.
(5) The carbon material of any one of (1) to (4) in which a BET specific surface area S is greater than or equal to 400 m$^2$/g and less than or equal to 2600 m$^2$/g.
(6) The carbon material of any one of (1) to (5) in which an edge site amount $N_{edge}$ is less than or equal to 500 μmol/g.
(7) The carbon material of any one of (1) to (6) in which an edge site specific surface area Sedge is less than or equal to 30 m$^2$/g.
(8) The carbon material of any one of (1) to (7) in which a pore volume $V_{total}$ is greater than or equal to 1.9 cm$^3$/g and less than or equal to 5 cm$^3$/g.
(9) An anode for a power storage device in which the carbon material of any one of (1) to (8) is used as a conductive agent.
(10) A cathode for a power storage device in which the carbon material of any one of (1) to (8) is used as a conductive agent.
(11) A power storage device including a cathode and/or an anode in which the carbon material of any one of (1) to (8) is used as a conductive agent.

Advantageous Effects of Invention

According to the present invention, it is possible to provide a carbon material that can achieve electrical conductivity or durability together with flexibility against compression and provide a long-life power storage device in which the carbon material is used in at least a conductive agent of the cathode and/or anode.

DESCRIPTION OF EMBODIMENTS

One example of embodiments of the present invention will be described below. The present invention is not limited to the following examples. The drawings used in the following illustration are schematic diagrams in which some characterized portions may be depicted enlarged for purposes of illustration for easier understanding of features of the present invention. Thus, the number of each component, a dimensional ratio, and the like may differ from those in the actual implementation. Materials, dimensions, numerical values, or the like illustrated as examples in the following description each are an example, the present invention is not limited thereto and can be suitably changed in implementation within the scope not changing the spirit of the invention.

[Carbon Material]

Figure 1:
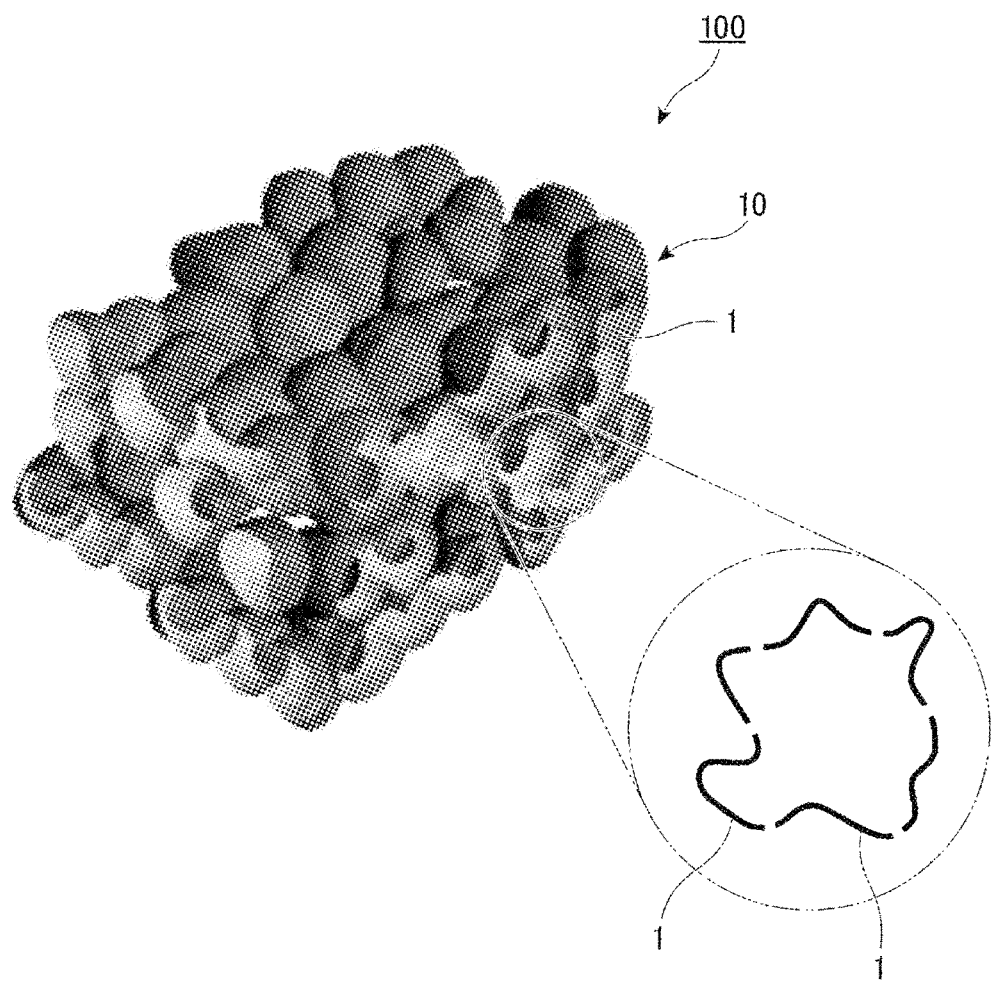
FIG. 1 is a perspective view illustrating an example of a configuration of a carbon material according to one embodiment of the present invention.

FIG. 1 is a perspective view illustrating an example of a configuration of a carbon material according to one embodiment of the present invention. A carbon material 100 illustrated in FIG. 1 has a bulk modulus K that is less than or equal to 2 GPa and an average graphene domain size L that is greater than or equal to 50 nm. For example, the carbon material 100 has a three-dimensional porous structure. For example, the carbon material 100 has a graphene framework 10. For example, the graphene framework 10 is formed of a plurality of graphene sheets 1. The fact that the carbon material 100 has a graphene framework is confirmed by Raman spectroscopy measurement. The carbon material 100 has pore structures corresponding to the shape of template nanoparticles described later, for example.

A smaller bulk modulus K of the carbon material 100 represents higher mechanical flexibility, and the bulk modulus K is preferably 1.5 GPa or less, more preferably 1.0 GPa or less, and further preferably 0.7 GPa or less. Herein, in the present embodiment, the bulk modulus K is calculated by mercury intrusion measurement. In the present embodiment, the mechanical flexibility is an index related to difficulty in fracture when a mechanical stress is applied to a carbon material.

The average graphene domain size L of the carbon material 100 is preferably 70 nm or greater, more preferably 100 nm or greater, and further preferably 150 nm or greater. A larger average graphene domain size L of the carbon material 100 will result in a smaller amount of the edge site and structural enhanced durability and can improve the energy density when utilized for a power storage device. The average graphene domain size L of the carbon material 100 is an average value of the size in an expansion direction of graphene in the plurality of graphene sheets 1 included in the graphene framework 10 forming the carbon material 100. The average graphene domain size L of the carbon material 100 is calculated from an edge site amount $N_{edge}$ (μmol/g) and a basal site amount $N_{basal}$ (μmol/g) of the carbon material 100 measured by a temperature-programmed desorption method. Due to a large graphene domain size L, when the carbon material 100 is applied for electrodes of an electric double-layer capacitors (EDLC), the electrolyte solution is less likely to decompose even with application of a high voltage, that is, a high voltage can be applied thereto. Thus, the energy density can be further improved, and reliability can also be improved.

The edge site amount $N_{edge}$ of the carbon material 100 is, for example, 600 μmol/g or less, preferably 500 μmol/g or less, more preferably 300 μmol/g or less or may be 250 μmol/g or less or 150 μmol/g or less. When the edge site amount $N_{edge}$ is small in the carbon material 100 having a large graphene domain size L, the effect when the carbon material 100 is applied for the electrode of an EDLC as described in the previous paragraph is particularly likely to be obtained.

The edge site specific surface area S edge of the carbon material 100 is, for example, 100 $m^2/g$ or less, preferably 30 $m^2/g$ or less, more preferably 20 $m^2/g$ or less, further preferably 15 $m^2/g$ or less or may be 10 $m^2/g$ or less.

The carbon material 100 is formed of a porous carbon material, for example. In the carbon material 100, each of the graphene sheets 1 forming the graphene framework 10 includes the structure other than six-membered rings. Specifically, each of the graphene sheets 1 includes at least one type selected from a group consisting of five-membered rings, seven-membered rings, and eight-membered rings, for example. Because the graphene sheets 1 include the structure other than six-membered rings, the plane network of the graphene framework is distorted, and the three-dimensional porous structure of the carbon material 100 as illustrated in FIG. 1 is formed.

The nitrogen content N in graphene domain of the carbon material 100 is, for example, 0 wt % or greater and 20 wt % or less, preferably 0 wt % or greater and 10 wt % or less, and more preferably 0 wt % or greater and 5 wt % or less. The nitrogen content in graphene domain of the carbon material 100 may be 0 wt %. The nitrogen content N in graphene domain of the carbon material 100 being within the range described above is preferable in terms of flexibility. The nitrogen content N in graphene domain of the carbon material 100 is measured by a method such as organic element analysis, X-ray photoelectron spectroscopy, or TPD measurement.

The BET specific surface area S of the carbon material 100 is, for example, 400 $m^2/g$ or greater and 2600 $m^2/g$ or less, preferably 1000 $m^2/g$ or greater or 1500 $m^2/g$ or greater and 2600 $m^2/g$ or less, and more preferably 1800 $m^2/g$ or greater and 2600 $m^2/g$ or less.

The average number of stacking layers n of the carbon material 100 is, for example, one or greater and six or less, preferably one or greater and three or less, and more preferably one or greater and two or less. The average number of stacking layers n of the carbon material 100 is calculated as the average number of stacking layers n of carbon layers by finding a ratio of a graphene theoretical specific surface area $S_{graphene}$ (2627 $m^2/g$) to a basal specific surface area $S_{basal}$ as indicated by Equation (1) below. The basal specific surface area $S_{basal}$ is a difference between specific surface areas S and Sedge. The specific surface area S is a specific surface area of the carbon material 100 and is calculated from a nitrogen adsorption isotherm.

[Math. 1]

$$n = \frac{S_{graphene}}{S - S_{edge}} - \frac{S_{graphene}}{S_{basal}} \quad (1)$$

The pore diameter d of the carbon material 100 is, for example, 1 nm or greater and 100 nm or less and preferably 5 nm or greater and 65 nm or less or may be 20 nm or less, 15 nm or less, or 12 nm or less. The pore diameter d of the carbon material 100 is calculated by the BJH method according to JISZ8831-2:2010 or the DFT method according to JISZ8831-3:2010. Since the BJH method makes it possible to accurately measure a pore diameter ranging from 2 to 50 nm, in particular, a pore diameter in such a range is calculated by the BJH method, and a pore diameter out of the range is calculated by the DFT method. That is, when the pore diameter is calculated as being less than 2 nm or greater than 50 nm by the BJH method, the pore diameter is then calculated by the DFT method.

The pore diameter d is adjustable by the particle diameter of nanoparticles forming a template, for example.

The pore volume $V_{total}$ of the carbon material 100 is, for example, 1.3 cm³/g or greater and 5 cm³/g or less, preferably 1.9 cm³/g or greater and 5 cm³/g or less, and more preferably 2.5 cm³/g or greater and 5 cm³/g or less. The pore volume of the carbon material 100 is calculated by nitrogen adsorption/desorption measurement.

The carbon material according to one embodiment of the present invention is, for example, a porous carbon material having pores each corresponding to the shape of nanoparticles forming a template and has a bulk modulus K that is less than or equal to 2 GPa and an average graphene domain size L that is greater than or equal to 50 nm. This makes it possible to obtain high electrical conductivity and durability together with mechanically high flexibility.

[Manufacturing Method of Carbon Material]

Figure 2:
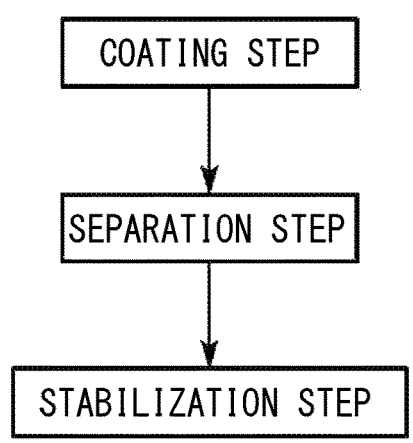
FIG. 2 is a flowchart illustrating an example of a manufacturing method of the carbon material according to one embodiment of the present invention.

FIG. 2 is a flowchart illustrating an example of a manufacturing method of the carbon material according to the present embodiment. The manufacturing method of the carbon material according to the present embodiment includes, for example, a coating step of coating a template with a carbon layer to obtain a molding, a separation step of dissolving the template with acid to separate the molding and the template from each other, and further, after the separation step, a stabilization step of performing heat treatment on the moldings separated from the template in the separation step.

<Coating Step>

Figure 3:
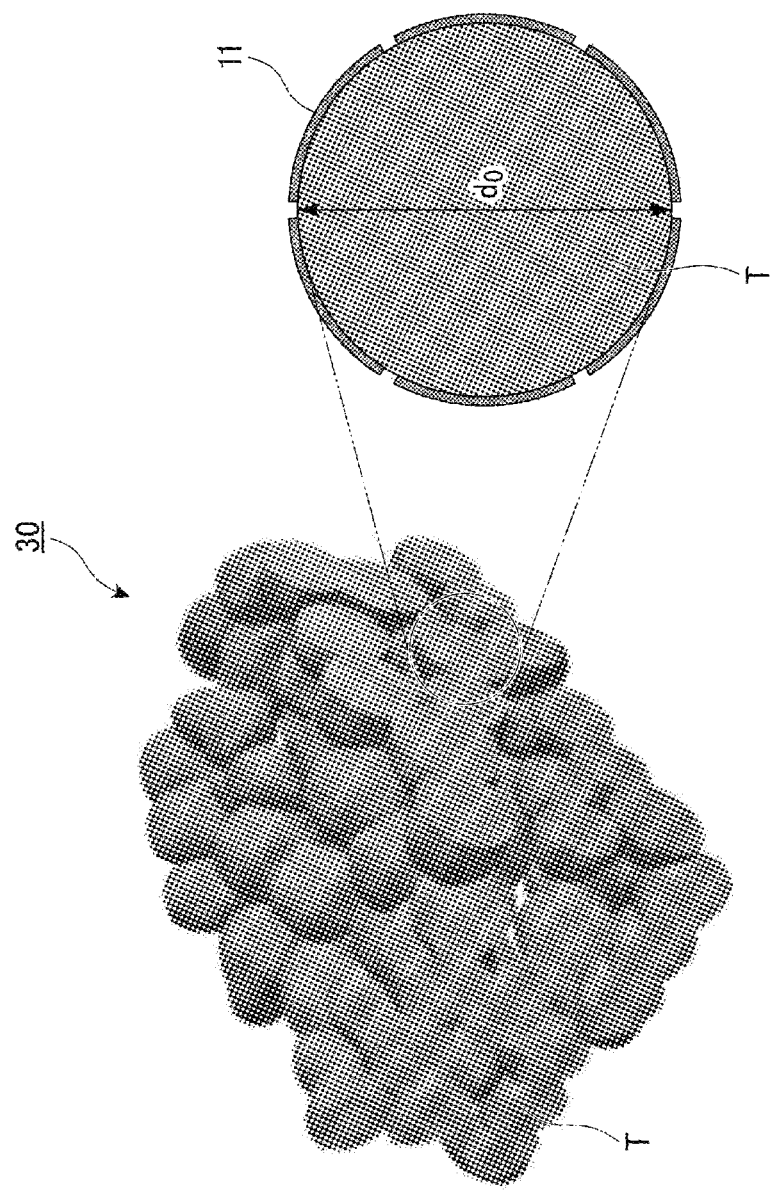
FIG. 3 is a diagram illustrating the manufacturing method of the carbon material according to one embodiment of the present invention, which is a diagram illustrating a view of a coating step.

First, a carbon layer is coated on a template to obtain a molding. FIG. 3 is a diagram illustrating the manufacturing method of the carbon material according to one embodiment of the present invention, which is a diagram illustrating a view of the coating step. Specifically, FIG. 3 represents a partial sectional perspective view of the molding in which template nanoparticles are coated with the carbon layer and an enlarged sectional view of a part near one template nanoparticle. In a molding 30 illustrated in FIG. 3, a template T is coated with a carbon layer 11 (black bold lines). Further, FIG. 3 illustrates the particle diameter do of the nanoparticle of the template T.

As the template T, for example, a template formed of metal nanoparticles that is soluble in acid in the separation step is used. In the separation step, when hydrofluoric acid is used, the template T formed of nanoparticles of alumina, zeolite, or the like can be used. In the separation step, it is preferable to use the template T formed of metal nanoparticles formed of alkaline earth metal oxide in terms of avoiding the use of hydrofluoric acid. Specifically, the template T formed of nanoparticles of magnesium oxide, calcium carbonate, or calcium oxide can be used.

The coating of the carbon layer 11 on the template T can be performed by any of a wet method such as an impregnation method or a dry method such as a chemical vapor deposition (CVD) method, for example, and in combination of the dry method with the wet method, the dry method may be performed after the wet method is performed. It is preferable to utilize a chemical vapor deposition (CVD) method, which is a dry method, for the coating with the carbon layer 11 in the coating step in terms of controlling the stack number of the carbon layer 11 to be formed to one layer or one or more layers.

The present embodiment will be described below with an example of a solution to coat the template T with the carbon layer 11 by the CVD method to obtain the molding 30. The coating with the carbon layer 11 by the CVD method may be performed separately in multiple times.

In the coating step, as the source gas in the CVD method, an organic compound such as acetylene, methylacetylene, ethylene, propylene, isoprene, cyclopropane, methane, ethane, propane, benzene, toluene, vinyl compounds, ethylene oxide, methanol, ethanol, acetonitrile, acrylonitrile, or the like is used. In terms of easier introduction of a gas into the gap G of the template T, it is preferable to use acetylene, ethylene, propylene, methane, or ethane as the source gas.

When performed with the CVD method, the coating step is performed with heating and can be performed at a heating temperature of 400 to 1500° C., for example. The pressure when the CVD is performed can be, for example, 1 to 200 kPa. Further, the rate of temperature rise in the coating step is, for example, 1 to 50° C./min.

In the coating step, in addition to the source gas described above, an inert gas may be used as a carrier gas, for example. Further, as the carrier gas, a gas containing an oxygen gas, a hydrogen gas, or the like may be used other than an inert gas. In the coating step, in terms of coating with one to two carbon layers 11, it is preferable to control the flow rate of the carrier gas to be 0.05 to 1.00 m/min and control the amount of the source gas to the total amount of the source gas and the carrier gas to be 1 to 60% by volume.

In the coating step, when the wet method is performed, the carbon layer may be impregnated with an organic compound for carbonization, for example.

Further, the coating step may be performed by using a nitrogen-containing solvent so that the carbon layer to be formed is doped with nitrogen. For example, chemical vapor deposition may be performed on the template nanoparticles T by causing an inert gas to flow through the nitrogen-containing solvent. As the nitrogen-containing solvent, acetonitrile, acrylonitrile, ethylenediamine, pyridine, or the like can be used.

<Separation Step>

Figure 4:
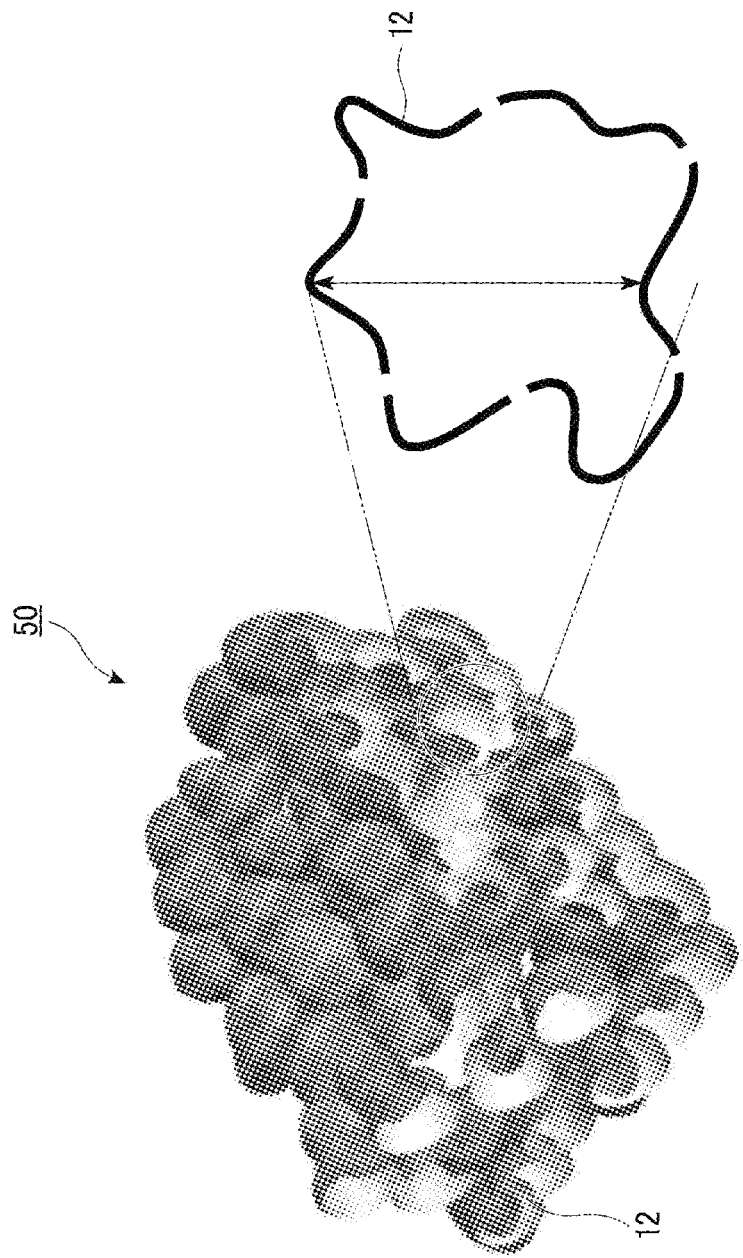
FIG. 4 is a diagram illustrating the manufacturing method of the carbon material according to one embodiment of the present invention, which is a diagram illustrating a view of a separation step.

Next, the template T is dissolved in acid or the like to separate the molding 30 described above and the template T from each other. FIG. 4 is a diagram illustrating the manufacturing method of the carbon material according to one embodiment of the present invention, which is a diagram illustrating a view of the separation step. A molding 50 illustrated in FIG. 4 is a precursor of the carbon material 100 formed of a carbon layer 12. The molding 50 illustrated in FIG. 4 is referred to as a carbon mesosponge (CMS). FIG. 4 represents the pore diameter d of the molding 50.

In the separation step, for example, inorganic acid such as hydrofluoric acid, hydrochloric acid, sulfuric acid, nitric acid, phosphoric acid, boric acid, or the like; organic acid having a carboxyl group, a hydroxyl group, a thiol group, alkenol structure, or the like within a molecule: or a mixture thereof may be used. When a template formed of an alkaline earth metal is used as the template T, a porous template is dissolved in acid which contains no hydrofluoric acid. It is desirable not to use hydrofluoric acid when taking safety, environmental loads, and costs into consideration. The use of a template formed of an alkaline earth metal that is soluble in acid such as hydrochloric acid or sulfuric acid other than hydrofluoric acid makes it possible to avoid the use of hydrofluoric acid.

Further, in general, the acid containing fluorine, such as hydrofluoric acid, forms a poorly soluble compound together with an alkaline earth metal contained in alkaline earth metal oxide and thus forms a compound that is poorly soluble in an aqueous medium in the process of dissolution of the alkaline earth metal oxide. In contrast, the use of acid containing no fluorine makes it possible to form a compound that is easily dissolved in an aqueous medium without forming any insoluble salt. That is, according to the present embodiment, with the use of acid not containing hydrofluoric acid, the porous template can be easily dissolved when an alkaline earth metal oxide, in particular, magnesium oxide or calcium oxide is employed as a template forming the template T. Herein, "dissolving" means forming a clear and uniform liquid ultimately without turbidity and without a residual insoluble compound in an aqueous medium when a template and acid of an aqueous medium are in contact with each other.

In the separation step, the amount of acid used for separating the molding 30 from the template T is, for example, one time or greater and preferably 1.2 times or greater relative to the template T in a stoichiometric ratio. In the separation step, the temperature at which the template T is dissolved in acid is, for example, within a range of 5 to 100° C. In the separation step, for example, stirring operation, vibration operation, or the like may be performed on the acid with which the porous template has been mixed.

In the separation step, for example, the porous carbon material separated from the template T can be produced by being collected by filtration and then dried by vacuum heating drying. The collection of the molding 50 may be performed by suction filtration, for example. The vacuum dry heating for obtaining the porous carbon material can be performed under conditions at a temperature of 100 to 200° C. for 1 to 10 hours, for example. In terms of avoidance of capillary contraction of the molding 50 due to the vacuum dry heating, substitution with a medium having small surface tension, such as acetone or alcohols may be performed after suction filtration is performed. The molding 50 obtained by this step is a CMS described later in detail. The degree of capillary contraction depends on the shape and the size of the molding 50, and contraction to about half may occur in some cases.

The shape of the carbon layer 12 of the molding 50, which is obtained after the separation step, has changed from the shape of the carbon layer 11, which is obtained before the separation step, into a locally distorted structure due to occurrence of the capillary contraction described above. The pore diameter d of the carbon layer 12 is smaller than the particle diameter do of the template nanoparticle T. That is, the ratio d/do of the pore diameter d of the carbon layer 12 to the particle diameter do of the template nanoparticle T is a value that is less than 1.

<Stabilization Step>

Next, after the separation step, heat treatment is performed on the molding separated from the template T, which is obtained in the separation step. In the stabilization step, the heat treatment on the molding can be performed at 900 to 2000° C. for 0.1 to 5 hours, for example. The heat treatment on the molding in the stabilization step is preferably performed at 1600 to 1800° C. for 0.5 to 2 hours.

Due to the stabilization step, the carbon layer 12 of the molding 50 has an expanded graphene domain size L and thus changes to the carbon layer (graphene sheet) 1, and the carbon material 100 as illustrated in FIG. 1 is obtained.

Further, the manufacturing method of the carbon material according to the present embodiment may further include a manufacturing step not described in the above manufacturing method. For example, a heat treatment step may be provided before the coating step. Further, a hot press step of compressing the molding at a high temperature may be further provided between the separation step and the stabilization step. Further, an adjustment step of adjusting the configuration of the carbon material to be molded may be further provided. For example, the adjustment step can be performed before the coating step, between the coating step and the separation step, or alternatively between the separation step and the stabilization step.

<Heat Treatment Step>

The manufacturing method of the carbon material according to the embodiment described above may have a heat treatment step of performing heat treatment on the template T before the coating step. For example, the heat treatment on the template T is performed under an inert gas atmosphere, under an air atmosphere, or under vacuum. In the heat treatment on the template T, for example, heating is performed at 400 to 1100° C., preferably heating is performed at 500 to 1000° C., and more preferably heating is performed at 600 to 950° C. The heat treatment on the template T is performed for 0.1 to 3 hours and preferably performed for 0.2 to 1 hour, for example. By performing the heat treatment on the template T under the condition described above before the coating step, it is possible to decompose impurities when the impurities have been mixed in the template T. As a specific example, when the template T formed of magnesium oxide is used, magnesium hydroxide or magnesium carbonate mixed in the template T is decomposed and desorbed from the template T by the heat treatment. The heat treatment step described above can increase the specific surface area S of the template T and increase the pore diameter d.

<Hot press Step>

In the hot press step, for example, a pressure is applied to the molding 50, and the molding 50 is heated. Specifically, the molding 50 is installed in a mold, a pressure is applied thereto, and the molding 50 and the mold are heated to an elevated temperature. By performing hot press step between the separation step and the stabilization step, it is possible to obtain a carbon material having a small pore volume.

<Adjustment Step>

In the adjustment step, the configuration of the carbon material is adjusted based on Equation (2) below. Specifically, manufacturing conditions are adjusted so as to have desired values of the graphene domain size L of the carbon material, the average number of stacking layers n of the carbon material, the nitrogen content N in graphene domain of the carbon material, the pore diameter d of the porous carbon material, and the surface twist t in order to have a desired value of the bulk modulus K. Equation (2) below is an equation found by the present inventors and indicates a correlation between a bulk modulus and five variables of a carbon material.

[Math. 2]

$$K = \alpha \times \frac{L^{0.8} n^{0.8} N^{0.8}}{d^{0.5} t^{5.9}} \qquad (2)$$

(In the equation, L: graphene domain size of a carbon material [nm], n: carbon layer average number of stacking layers of the carbon material, N: nitrogen content in graphene domain of the carbon material [wt %], d: pore diameter of the carbon material [nm], t: surface twist)

In the adjustment step, in Equation (2), the graphene domain size L (nm) of the carbon material is adjusted to satisfy 70≤L≤1000 and preferably adjusted to satisfy 100≤L≤1000, the average number of stacking layers n of carbon layers of the carbon material is adjusted to satisfy 1≤n≤6 and preferably adjusted to satisfy 1≤n≤3, the nitrogen content N (wt %) in graphene domain of the carbon material is adjusted to satisfy 0≤N≤20 and preferably adjusted to satisfy 0≤N≤10, the pore diameter d (nm) is adjusted to satisfy 1≤d≤100 and preferably adjusted to satisfy 5≤d≤70, and the surface twist t is adjusted to satisfy 1.1≤t≤20 and preferably adjusted to satisfy 1.3≤t≤10. Herein, when the solution including the stabilization step is employed as the manufacturing method of the carbon material described above, the value d in Equation (2) above represents a pore diameter of the carbon material obtained after the stabilization step.

For example, the graphene domain size L is adjusted by adjustment of the conditions of the coating step and the stabilization step in the manufacturing method described above. The graphene domain size L is increased by at least one of increasing the carbon coating amount in the coating step and increasing the heating temperature or increasing the reaction time in the stabilization step.

For example, the average number of stacking layers n of carbon layers of the carbon material is adjusted by adjustment of the conditions of the coating step and the stabilization step in the manufacturing method described above. The average number of stacking layers n of carbon layers is increased by increasing the heating temperature or increasing the reaction time in the coating step.

For example, the nitrogen content N in graphene domain of the carbon material is adjusted by adjustment of the condition in the coating step in the manufacturing method described above.

The pore diameter d of the porous carbon material is adjusted by at least one of adjustment of the template to be used and adjustment of the condition of the separation step. The pore diameter d is increased by at least one of using a template having a large particle diameter and adjusting the dry condition in the separation step.

The surface twist t is a variable related to contraction occurring when the template is removed and dried in the separation step. The surface twist t is defined by Equation (3) below. That is, the surface twist t is found from a ratio between the surface area of a template particle and the surface area of a sphere assumed with a pore diameter of the template graphene. The surface twist t is adjusted by at least one of the steps of adjusting the template, adjusting the pore diameter d, and adjusting the average number of stacking layers n.

[Math. 3]

$$t = \frac{4\pi r_0^2}{4\pi r^2} = \frac{d_0^2}{d^2} \qquad (3)$$

With the adjustment step, it is possible to manufacture the carbon material having a desired graphene domain size L and a desired bulk modulus K.

[Design Method of Carbon Material]

Consideration on the manufacturing method of the carbon material described above can be applied to the design method about flexibility of the carbon material. For example, the following design method can be implemented.

First, as a step of setting flexibility parameters of a carbon material, five parameters of the graphene domain size L of the carbon material, the average number of stacking layers n of the carbon material, the nitrogen content N in graphene domain of the carbon material, the pore diameter d of the porous carbon material, and the surface twist t are set as flexibility parameters of the carbon material that configure the bulk modulus K of the carbon material.

Next, as a step of setting flexibility of a product, a range of the bulk modulus K of the carbon material forming the product is set.

Next, as a step of discriminating parameters, one or more parameters which are specified in accordance with product design and one or more parameters which can be freely designed are discriminated.

The parameters to be freely set are then set by using Equation (2) above to realize the set range of the bulk modulus K.

Accordingly, the parameters of flexibility of the carbon material forming a product are set.

The specific parameter of flexibility is set by the adjustment step or the like in the manufacturing method of the carbon material.

Next, a lithium-ion secondary battery that is the power storage device of the present invention will be described.

Figure 20:
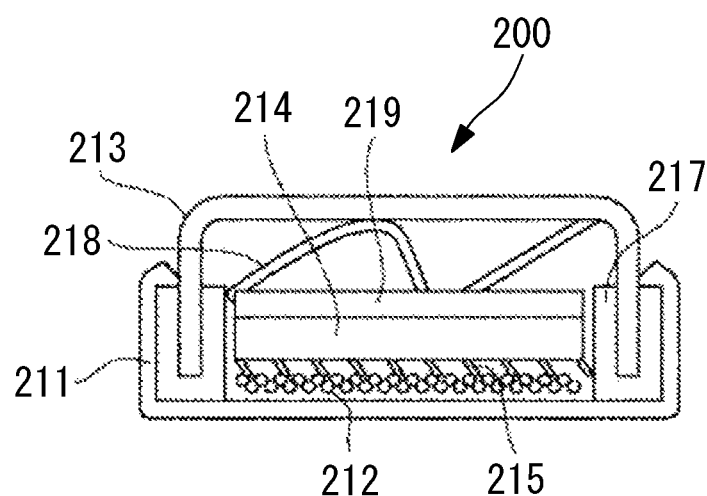
FIG. 20 is a diagram illustrating an example of a sectional structure of a power storage device according to one embodiment of the present invention.

FIG. 20 illustrates an example of a sectional structure of a coin-type power storage device (lithium battery) 200 according to one embodiment of the present invention. The power storage device 200 is a device in which a disc-like cathode 212 accommodated in a metal exterior component 211 and a disc-like anode 214 accommodated in a metal exterior component 213 are stacked via a separator 215. Note that a metal spring 218 and a spacer 219 are arranged between the exterior component 213 and the anode 214. The inside of the exterior component 211 and the exterior component 213 is filled with a liquid electrolyte, and the circumferential edges of the exterior component 211 and the exterior component 213 are crimped via a seal gasket 217 and sealed.

The cathode will be described.

The cathode 212 is obtained by, for example, applying slurry that is a mixture of a metal oxide-based material, a conductive auxiliary material to assist electron conductivity, a binder, and a solvent onto a current-collecting metal foil such as a rolled aluminum foil to form a coated membrane, heating and drying the coated membrane to remove the solvent, and then forming the electrode into a predetermined dimension and a predetermined density.

The metal compound-based material that can be used for a cathode active substance refers to a material that enables release of electrons to an external circuit of the battery and, at the same time, release of Li ions to the electrolyte. The quantity of contained Li ions differs in accordance with the chemical composition, the crystalline structure, or the like thereof, and such a material that can reversibly transfer a large number of Li ions in and out is preferable.

Such a material may be a transition metal oxide, a composite oxide of lithium and a transition metal, a transition metal sulfide, or the like. As the transition metal, Fe, Co, Ni, Mn, or the like may be used. Specific examples may be inorganic compounds of transition metal oxides such as $MnO$, $V_2O_5$, $V_6O_{13}$, $TiO_2$, or the like, $LiNiO_2$, $LiCoO_2$, $LiMn_2O_4$, or the like, or $TiS_2$, $FeS$, $MoS_2$, or the like, and may be compounds in which some particular elements of these compounds are substituted by certain elements in order to improve the characteristics thereof.

There also are cathode materials made of organic compounds other than the inorganic compound described above. The organic compound may be, for example, polyaniline, polypyrrole, polyacene, a disulfide-based compound, a polysulfide-based compound, an N-fluoropyridinium salt, or the like. The cathode material may be a mixture of the inorganic compound and the organic compound described above.

The physical property of the cathode material is determined from requirement items of battery design and manufacturing processes due to constrained conditions such as a usage form of the power storage device. In manufacturing of a cathode material, process design or the like are made so that the required physical property can be realized. The physical property value may be a powder particle diameter and distribution, a specific surface area, a density, or the like.

As an example, the powder particle diameter is suitably selected taking balance with other configuration requirements of the power storage device into consideration and typically is preferably 1 to 30 μm and more preferably 1 to 10 μm as an average value in terms of improved battery characteristics such as rate characteristics, cycle characteristics, or the like.

Since the cathode material described above has generally low electron conductivity, it is preferable to have a conductive agent to assist electron conductivity coexist in the cathode. The material of the conductive agent may be a carbon-based material or a metal-based material, other materials having high electron conductivity can be used, and the carbon-based material is preferable among the materials listed above.

The amount of the conductive agent to coexist should be the minimum necessary, and the content rate of the cathode material to define the capacity of the power storage device should be raised to the maximum.

The conventional carbon-based material may be soot, acetylene black, Ketjen black, lamp black, furnace black, carbon black, graphite, carbon fiber, graphite fiber, nanofiber, nanotube, coke, hard carbon, amorphous carbon, or the like.

Compared to the above, the conductive agent of the present embodiment has a major feature that is not present in the conventional materials, as described above. That is, the conductive agent of the present embodiment is featured in having elasticity against a stress while having a nanocarbon-like microstructure and in also having less oxygen-containing functional groups while having a high specific surface area.

Because of having such a feature, electron conductivity of the electrode can be maintained even in an electrochemical oxidation environment or a stress environment to which the conductive agent is exposed in a battery, and deterioration of characteristics can be suppressed.

A preferred ratio at which the conductive agent made of the carbon material of the present embodiment is contained in the cathode varies in accordance with a difference in the type of the cathode material, the type and the amount of the binder, the battery capacity design, or the like, and the preferred ratio is preferably 0.03 wt % or higher in the cathode mixture.

The cathode material and the conductive agent described above are often in a powder form, and accordingly, to fix the cathode material and the conductive agent to each other or fix the cathode material and the conductive agent onto the current-collecting metal foil, it is preferable to mix a small amount of a binder therewith before use. It is requested for the binding material to be chemically and electrochemically inert and have flexibility and affinity to some degrees, and a plastic resin material is preferably used.

The plastic resin material described above may be, for example, a fluorine-based resin such as polyvinyl fluoride, polyvinylidene fluoride, polytetrafluoroethylene, or the like; a CN group-containing polymer such as polyacrylonitrile, polyvinylidene cyanide, or the like; a polyvinyl alcohol-based polymer such as polyvinyl acetate, polyvinyl alcohol, or the like; a halogen-containing polymer such as polyvinyl chloride, polyvinylidene chloride, or the like; a conductive polymer such as polyaniline; an alkane-based polymer such as polyethylene, polypropylene, poly-1,1-dimethylethylene, or the like; an unsaturated polymer such as polybutadiene, polyisoprene, or the like; a polymer with rings, such as polystyrene, polymethylstyrene, polyvinylpyridine, poly-N-vinylpyrrolidone; an acrylic polymer such as methyl polymethacrylate, ethyl polymethacrylate, butyl polymethacrylate, methyl polyacrylate, ethyl polyacrylate, polyacrylic acid, polymethacrylic acid, polyacrylamide, or the like; or the like. Further, a mixture, a modified material, a derivative, a random copolymer, an alternating copolymer, a graft copolymer, a block copolymer, or the like of the resin materials described above may be used. The weight average molecular weight of these resins is typically 10,000 to 3,000,000 and preferably 100,000 to 1,000,000. An excessively small molecular weight will result in a reduced strength of the coated membrane, and an excessively large molecular weight will result in an increased viscosity and makes it difficult to form the electrode.

To distribute the binding material in a sufficiently uniform manner and form a coated membrane in a predetermined dimension from slurry, a suitable slurry solvent which dissolves only the binding material resin and does not dissolve the remaining materials can be used. To give an example, when polyvinylidene fluoride is used, dimethylformamide is preferably used for the solvent. Alternatively, N-methyl pyrrolidone may be used for the solvent, and suitably selected solvent can be used in accordance with conditions of the manufacturing process.

As the current-collecting metal foil, a material that is inexpensively available and durable against industrial use is preferable, and a material having electrochemical durability against the potential emitted from the cathode is preferably used. As examples of the current-collecting metal foil, an aluminum foil, a nickel foil, a titanium foil, or a stainless foil is preferable, and a rolled aluminum foil that is easily available in general is more preferable.

As a method of forming a slurry-coated membrane described above, a generally used printing technique is available. Gravure printing or the like are preferably used when the thickness dimension of the coated membrane is small, and a printing scheme such as doctor blade printing or die printing is preferably used when the thickness dimension of the coated membrane is large.

The coated membrane is then heated and dried. Herein, any drying method can be used, and a method that can realize a desired binding strength using a binding material is preferably used.

Further, when the cathode is then formed in a predetermined dimension, an industrially available cutting blade or the like and the scheme thereof are preferably used. Further, to realize a predetermined density, an industrially available pressure device or the like and the scheme are preferably used if necessary.

Next, the anode will be described.

The anode 214 is obtained by, for example, coating slurry, which is a mixture of a carbon-based material, a binder, and a solvent, onto a current-collecting metal foil such as a rolled copper foil, heating and drying the coated membrane to remove the solvent, and then forming the electrode into a predetermined dimension and a predetermined density.

As the carbon-based material that can be used for the anode, such a material that can bind and stabilize Li ions and electrons flowing therein from an external circuit and has a large number of stabilized sites therein is preferable.

To give some examples, materials originating from an organic matter whether having high crystalline or low crystalline can be used, and graphite, coke, amorphous carbon, hard carbon, polymer carbon, or the like can be preferably used. In such a case, the principle is that Li ions are interposed between graphene layers and the like and, in this state, coupled with electrons and stabilized.

Further, a scheme to electrochemically form an intermetal compound can also be used as a stabilizing mechanism in addition to the above, and silicon, tin, zinc, bismuth, antimony, cadmium, lead, germanium, or the like can be preferably used.

Further, other materials exhibiting a low electrochemical reaction potential, which serves as the anode side of the power storage device, can also be used. Preferably, such materials may be compounds of a metal and oxygen, sulfur, halogen, nitrogen, phosphorus, or the like.

Further, for some use of the power storage device, a plurality of anode materials described above can be mixed at a predetermined ratio and used in order to obtain any discharge profile.

The physical property of the anode material is determined from requirement items of design of a device (storage battery as an example) and manufacturing processes due to constrained conditions such as a usage form of the power storage device. In manufacturing of a material, process design or the like are made so that the required physical property can be realized. The physical property value may be a powder particle diameter and distribution, a specific surface area, a density, or the like.

As an example, the powder particle diameter is suitably selected taking balance with other configuration requirements of the power storage device into consideration and typically is preferably 1 to 70 µm and more preferably 3 to 30 µm as an average value in terms of improved battery characteristics such as rate characteristics, cycle characteristics, or the like.

The anode material described above has generally high electron conductivity, and some materials have a smooth surface. When contact between particles is insufficient, it is also preferable to have a conductive agent to assist electron conductivity coexist in the anode. The material of the conductive agent may be a carbon-based material or a metal-based material, other material having high electron conductivity can also be used, and the carbon-based material is preferable among the materials listed above.

The amount of the conductive agent to coexist should be the minimum necessary, and the content rate of the cathode material to define the capacity of the power storage device should be raised to the maximum.

The conventional carbon-based material may be soot, acetylene black, Ketjen black, lamp black, furnace black, carbon black, graphite, carbon fiber, graphite fiber, nanofiber, nanotube, coke, hard carbon, amorphous carbon, or the like.

Compared to the above, the conductive agent of the present embodiment has a major feature that is not present in the conventional materials, as described above. That is, the conductive agent of the present embodiment is featured in having elasticity against a stress while having a nanocarbon-like microstructure and in also having less oxygen-containing functional groups while having a high specific surface area.

Because of having such a feature, electron conductivity of the electrode can be maintained even in an electrochemical reduction environment or a stress environment to which the conductive agent is exposed in a battery, and deterioration of characteristics can be suppressed.

A preferred ratio at which the conductive agent made of the carbon material of the present embodiment is contained in the anode varies in accordance with a difference in the type of the anode material, the type and the amount of the binder, the battery capacity design, or the like, and the preferred ratio is preferably 0.03 wt % or higher per anode mixture.

For the current-collecting metal foil, a material that is inexpensively available and durable against industrial use is preferable, and a material having no electrochemical reactivity against the potential emitted from the cathode is preferably used. To give some examples, a copper foil, a nickel foil, a titanium foil, or a stainless foil is preferable as the current-collecting metal foil, and an electrolytic copper foil or a rolled copper foil that is easily available in general is more preferable.

As a method of forming a slurry-coated membrane described above, a generally used printing technique is available. Gravure printing or the like are preferably used when the thickness dimension of the coated membrane is small, and a printing scheme such as doctor blade printing or die printing is preferably used when the thickness dimension of the coated membrane is large.

The coated membrane is then heated and dried. Herein, any drying method can be used, and a method that can realize a desired binding strength using a binding material is preferably used.

Further, when the anode is then formed into a predetermined dimension, an industrially available cutting blade or the like and the scheme thereof are preferably used. Further, to realize a predetermined density, an industrially available pressure device or the like and the scheme are preferably used if necessary.

The anode material and the conductive agent described above are often in a powder form, and accordingly, to fix the anode material and the conductive agent to each other or fix the anode material and the conductive agent onto the current-collecting metal foil, it is preferable to mix a small amount of a binding material therewith before use. It is requested for the binding material to be chemically and electrochemically inert and have flexibility and affinity to some degrees, and a plastic resin material is preferably used.

The plastic resin material described above may be, for example, a fluorine-based resin such as polyvinyl fluoride, polyvinylidene fluoride, polytetrafluoroethylene, or the like; a CN group-containing polymer such as polyacrylonitrile, polyvinylidene cyanide, or the like; a polyvinyl alcohol-based polymer such as polyvinyl acetate, polyvinyl alcohol, or the like; a halogen-containing polymer such as polyvinyl chloride, polyvinylidene chloride, or the like; a conductive polymer such as polyaniline; an alkane-based polymer such as polyethylene, polypropylene, poly-1,1-dimethylethylene, or the like; an unsaturated polymer such as polybutadiene, polyisoprene, or the like; a polymer with rings, such as polystyrene, polymethylstyrene, polyvinylpyridine, poly-N-vinylpyrrolidone; an acrylic polymer such as methyl polymethacrylate, ethyl polymethacrylate, butyl polymethacrylate, methyl polyacrylate, ethyl polyacrylate, polyacrylic acid, polymethacrylic acid, polyacrylamide, or the like; carboxymethyl cellulose; styrene-butadiene rubber; or the like. Further, a mixture, a modified material, a derivative, a random copolymer, an alternating copolymer, a graft copolymer, a block copolymer, or the like of the resin materials described above may be used. The weight average molecular weight of these resins is typically 10,000 to 3,000,000 and preferably 100,000 to 1,000,000. An excessively small molecular weight will result in a reduced strength of the coated membrane, and an excessively large molecular weight will result in an increased viscosity and makes it difficult to form the electrode.

To distribute the binding material in a sufficiently uniform manner and form a coated membrane in a predetermined dimension from slurry, a suitable slurry solvent which dissolves only the binding material resin and does not dissolve the remaining materials can be used. To give an example, when polyvinylidene fluoride is used, dimethylformamide is preferably used for the solvent. Alternatively, N-methyl pyrrolidone may be used for the solvent, and suitably selected solvent can be used in accordance with conditions of the manufacturing process.

The electrolyte for the battery of the present invention will be described.

An electrolyte is a material in which a solute is dissolved in an organic solvent, and these solute and organic solvent are typically the main components.

One of the compositions of the electrolyte is a solute that is the origin of ions, that is, Li salts.

The type of the solute is not particularly limited, which is not particularly limited as long as it is known to be used for use of the power storage device, and any type of solutes may be used. Specifically, the following solutes may be employed.

Examples of the solutes may be an inorganic salt such as $LiPF_6$ or $LiBF_4$; a fluorine-containing organic Li salt such as $LiCF_3SO_3$, $LIN(CF_3SO_2)_2$, $LiN(C_2F_5SO_2)_2$, Li cyclic 1,2-perfluoroethane disulfonylimide, Li cyclic 1,3-perfluoropropane disulfonylimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, $LiBF_2(C_2F_5SO_2)_2$, or the like; Li bis(oxalate) borate; and the like.

Among the above, $LiPF_6$, $LiBF_4$, $LIN(CF_3SO_2)_2$, and $LiN(C_2F_5SO_2)_2$ are preferable in terms of exhibiting the battery performance, and in particular, $LiPF_6$ and $LiBF_4$ are preferable.

Note that these Li salts may be used alone or may be used in combination of two or more types thereof.

The content percentage of the Li salt in the electrolyte differs in accordance with the type or mixture composition of the solvent in which the Li salt is dissolved. The content percentage of the Li salt in the electrolyte is preferably 7 to 190% by weight, more preferably 10 to 180% by weight, and further preferably 13 to 150% by weight.

Next, the organic solvent used for the electrolyte will be described.

The type of the organic solvent is not particularly limited, and any organic solvent may be suitably selected and used from those conventionally known as a solvent. For example, cyclic carbonates, chain carbonates, cyclic ethers, chain ethers, cyclic carboxylic esters, chain carboxylic esters, phosphorus-containing organic solvents, or the like without unsaturated bond may be employed.

A factor affecting migration of Li ions is viscosity and a solvation ability of the organic solvent. The solvation ability is an ability to dissociate dissolved ions, and the optimal value thereof exists because an excessively high solvation capacity inhibits migration of ions.

Further, practical power storage devices are used under a wide range of usage environmental conditions, and in particular, the physical properties such as the melting point and the boiling point of the organic solvent are also required to fall in a certain range.

To address the requirement described above, a practical proposed solution is to use a mixture of a plurality of organic solvents. A mixture composition is determined taking practical properties into consideration from combinations in terms of respective physical properties, such as a combination of an organic solvent having a high melting point and an organic solvent having a low melting point, a combination of an organic solvent having a high solvation ability and an organic solvent having a low solvation ability, or the like.

In the electrolyte of the present embodiment, it is preferable to use a mixture of cyclic carbonate and chain carbonate both having no carbon-carbon unsaturated bond.

The cyclic carbonate may be alkylene carbonates having an alkylene group with two to four carbons, such as ethylene carbonate, propylene carbonate, butylene carbonate, or the like. Among the above, ethylene carbonate and propylene carbonate are preferable in terms of improved battery characteristics, and in particular, ethylene carbonate is preferable.

As the chain carbonates, dialkyl carbonate is preferable, and the number of carbons in each constituting alkyl group is preferably one to five, and particularly preferably one to four. Specifically, the chain carbonates may be, for example, dialkyl carbonate such as: symmetric chain alkyl carbonates such as dimethyl carbonate, diethyl carbonate, di-n-propyl carbonate, or the like; asymmetric chain alkyl carbonates such as ethyl methyl carbonate, methyl-n-propyl carbonate, ethyl-n-propyl carbonate, or the like; or the like. Among the above, dimethyl carbonate has the lowest viscosity and thus is preferable.

Since dimethyl carbonate has a slightly low boiling point, however, a more preferable property is obtained when chain carbonates exhibiting a higher boiling point are additionally mixed and used. While diethyl carbonate is preferable as the chain carbonate to be mixed, other chain carbonates can also be used without any problem.

The mixture ratio varies in accordance with desired practical properties. For the ratio of the chain carbonate to the cyclic carbonate, the optimal composition including the ratio of the Li salt exists.

The content percentage of the cyclic carbonate in the electrolyte is preferably 1 to 35% by weight, more preferably 3 to 30% by weight, and further preferably 4 to 25% by weight. A mixture of a plurality of cyclic carbonates can be used.

On the other hand, the content percentage of the chain carbonate in the electrolyte is preferably 40 to 70% by weight and further preferably 43 to 68% by weight. A mixture of a plurality of chain carbonates can be used.

As the overall composition, the following combinations are preferable.

In combinations of ethylene carbonate and dialkyl carbonates, a combination of ethylene carbonate and dimethyl carbonate is preferable, and symmetrical chain dialkyl carbonate and/or asymmetrical chain dialkyl carbonates may be further contained. For example, combinations containing ethylene carbonate, symmetric chain dialkyl carbonates, and asymmetric chain dialkyl carbonates, such as a combination of ethylene carbonate, dimethyl carbonate, and diethyl carbonate, a combination of ethylene carbonate, dimethyl carbonate, and ethyl methyl carbonate, and a combination of ethylene carbonate, dimethyl carbonate, diethyl carbonate, and ethyl methyl carbonate, are preferable because of good balance of cycle characteristics and high power discharge characteristics. Among the above, it is preferable that the asymmetric chain dialkyl carbonates be ethyl methyl carbonate, and it is preferable that the alkyl group of alkyl carbonate have one to two carbons.

Furthermore, as the solvent that assists dissociation, migration, or the like of ions, cyclic ethers, chain ethers, cyclic carboxylic esters, chain carboxylic esters, or the like can be auxiliary added to the primary organic solvent described above.

The cyclic ethers may be tetrahydrofuran, 2-methyltetrahydrofuran, or the like, and the chain ethers may be dimethoxyethane, dimethoxymethane, or the like.

The cyclic carboxylic esters may be γ-butyrolactone, γ-valerolactone, or the like, and the chain carboxylic esters may be methyl acetate, methyl propionate, ethyl propionate, methyl butyrate, or the like.

Among the above, in particular, chain carboxylic ester is preferred.

Furthermore, it is also preferable that fluorine-containing cyclic carbonate having two or more fluorine atoms be contained in the electrolyte of the present embodiment.

In a case of fluorinated ethylene carbonate, while not particularly limited, the number of fluorine atoms of the fluorine-containing cyclic carbonate having two or more fluorine atoms is, typically two or greater as the lower limit, typically four or less as the upper limit, and preferably three or less.

In a case of fluorinated propylene carbonate, the number of fluorine atoms is typically two or greater as the lower limit, typically six or less as the upper limit, and preferably five or less. In particular, those in which two or more fluorine atoms are coupled to the carbon forming the cyclic structure are preferable in terms of improved cycle characteristics and storage characteristics.

Among the above, fluorinated ethylene carbonate having two or more fluorine atoms is preferable in terms of improved battery characteristics, and cis-4,5-difluoro-1,3-dioxolan-2-one, trans-4,5-difluoro-1,3-dioxolan-2-one, or 4,4-difluoro-1,3-dioxolan-2-one is particularly preferable among other things.

The fluorine-containing cyclic carbonate having two or more fluorine atoms may be used alone or may be used in combination of two or more types thereof. While not particularly limited, the percentage of the fluorine-containing cyclic carbonate compound having two or more fluorine atoms in a nonaqueous electrolyte solution is typically 0.001% by weight or greater, preferably 0.01% by weight or greater, more preferably 0.1% by weight or greater, particularly preferably 0.2% by weight or greater, and the most preferably 0.25% by weight or greater in order to achieve the effect of the present embodiment. With a lower concentration than such a range, the effect of the present embodiment may be less likely to be achieved. In contrast, since an excessively high concentration may increase the pressure in the battery when stored at a high temperature, the upper limit is typically 10% by weight or less, preferably 4% by weight or less, more preferably 2% by weight or less, particularly preferably 1% by weight or less, and the most preferably 0.5% by weight or less.

Furthermore, cyclic carbonates having unsaturated bond or an aromatic compound having a total carbon number from 7 to 18 may be mixed in the electrolyte.

Among cyclic carbonates having unsaturated bond, vinylene carbonate, vinylethylene carbonate, 4-methyl-4-vinyl ethylene carbonate, or 4,5-divinylethylene carbonate is preferable in terms of improved cyclic characteristics, and vinylene carbonate or vinylethylene carbonate is more preferable among other things. These may be used alone or may be used in combination of two or more types thereof.

The aromatic compound having the total carbon number from 7 to 18 may be preferably an aromatic compound such as biphenyl, alkylbiphenyl, terphenyl, a partially hydrogenated product of terphenyl, cyclohexylbenzene, t-butylbenzene, t-amylbenzene, diphenyl ether, dibenzofuran, or the like.

It is considered that suppression of a side reaction of the aromatic compound having a total carbon number from 7 to 18 with the anode and the cathode in such a way suppresses a significant reduction in discharge characteristics after storage at a high temperature.

The percentage of the aromatic compound having the total carbon number from 7 to 18 in the electrolyte is typically 0.001% by weight or greater, preferably 0.1% by weight or greater, particularly preferably 0.3% by weight or greater, and the most preferably 0.5% by weight or greater, and the upper limit is typically 5% by weight or less, preferably 3% by weight or less, and particularly preferably 2% by weight or less in order to achieve the effect of the present embodiment. With a lower concentration than the lower limit, the effect of improving safety at overcharging may be less likely to be achieved. In contrast, an excessively high concentration may reduce the battery characteristics such as high-temperature storage characteristics.

The separator 215 isolates the cathode 212 and the anode 214 from each other to prevent short circuit with current due to contact between these electrodes and also passes lithium ions therethrough, and a resin porous membrane is preferably used.

As a form of the membrane, a stretched membrane in which holes are opened by stretching a bulk resin, a nonwoven fabric in which a vacancy structure such as a porous membrane can be made by lamination of multiple layers of fibrous resin fibers, or the like are preferably used.

The material of the resin may be polyolefins, and in particular, polyethylene is preferred. Polyethylene has a relatively low melting temperature, and when the temperature of the battery rises for some reason (for an unsafe state such as short circuit or the like as an example), holes in the membrane are closed by thermal melting, migration of driving ions is inhibited, and thereby the reaction is stopped, which can ensure safety.

Porous membranes formed by a stretching method typically have a relatively uniform microporous structure in which a plasticizer or the like are added to polyolefin, the plasticizer is removed before or after stretched, and portions where the plasticizer was present or the like serve as base points.

In manufacturing a stretched membrane, stretching is typically performed in both directions of the longitudinal direction and the width direction. In addition to the removal of the plasticizer or the like described above, a suitable combination of any atmospheric medium, temperature, rate, stress, process repetition number, or the like may provide a preferred stretched membrane.

Although a high-quality stretched membrane is obtained by the manufacturing steps described above, multiple stages of steps are required. It is thus difficult to reduce manufacturing costs such as production costs, which may be a negative factor for widespread use of power storage devices.

In contrast, by simplifying steps so as to perform stretching in only the longitudinal direction without using a plasticizer or the like, it is possible to obtain such a porous membrane that can be industrially manufactured and can reduce manufacturing costs. A resin applicable in such a case is polyolefin, and polypropylene is preferably used.

The separator interposed between the cathode and the anode can be formed of an electrically insulating porous material. For example, a polymer membrane of polyolefin such as polyethylene or polypropylene, polyester, polyethylene terephthalate, polyimide, or the like or fiber nonwoven fabric is applicable to the separator. A single type or multiple types of the materials may be used for the separator. Further, the separator may be formed of a single layer or multiple layers (composite membrane). Further, inorganic material nanoparticles such as ceramics may be contained in the separator. Further, a polymer compound such as polyvinylidene fluoride may be applied to both sides of the separator.

In the nonaqueous electrolyte battery according to the present embodiment, an electrolyte in a gel form obtained by containing a polymer compound serving as a retaining material to retain a nonaqueous electrolyte swollen by an organic solvent may be used. This is because it is possible to obtain high ion conductivity by containing a polymer compound swollen by an organic solvent and it is thus possible to obtain superior charge/discharge efficiency and prevent liquid leakage of the battery. When a polymer compound is contained in the nonaqueous electrolyte, it is preferable that the content of the polymer compound be within a range from 0.1% by mass to 10% by mass of the nonaqueous electrolyte.

Further, when a polymer compound such as polyvinylidene fluoride has been applied to both sides of the separator, it is preferable that the mass ratio of the nonaqueous electrolyte and the polymer compound be within a range from 50:1 to 10:1. When the mass ratio is within this range, higher charge/discharge efficiency is obtained.

The polymer compound described above may be, for example, an ether-based polymer compound such as polyvinylformal, polyethylene oxide, and a cross-linked material containing polyethylene oxide or the like, an ester-based polymer compound such as polymethacrylate, an acrylate-based polymer compound, and a polymer of vinylidene fluoride such as polyvinylidene fluoride, a copolymer of vinylidene fluoride and hexafluoropropylene, or the like. A single type of the polymer compound may be used alone, or a mixture of multiple types of the polymer compounds may be used. In particular, in terms of swelling prevention effect at high-temperature storage, it is desirable to use fluorinated polymer compounds such as polyvinylidene fluoride.

The power storage device having the configuration described above operates as follows.

Once the power storage device is charged, Li ions included in the cathode 212 pass through the separator 215 and are inserted between layers of the graphite layered structure included in the anode 214. When discharge is then performed, Li ions are desorbed from interfaces between the layers of the layered structure included in the anode 214, pass through the separator 215, and return to the cathode 212.

Although one embodiment of the present invention has been described above in detail, the present invention is not limited to the embodiment described above, and various modification and change are possible within the scope of the spirit of the present invention recited in the claims.

Although the description has been provided with an example of the coin-type lithium-ion battery as the power storage device in the above embodiment, the power storage device of the present embodiment can be applied similarly to power storage devices having other shapes such as a button type, a paper type, a rectangular type, or a cylindrical type having the spiral structure. Further, the power storage device of the present embodiment can be expanded to various sizes such as a thin size, a large size, or the like.

Furthermore, although the embodiment is expressed in which a case of the power storage device having a liquid electrolyte as the electrolyte according to the present embodiment has been assumed in the above description, any other electrolytes are applicable. To give some examples, gel electrolytes or solid electrolytes can also preferably used.

EXAMPLES

Examples of the present embodiment will be described below. The present invention is not limited to only the following Examples. First, the Examples of the carbon material according to the present embodiment will be described.

Example 1

<Template>

First, alumina nanoparticles (TAIMEI CHEMICALS CO., LTD., TM-100) were prepared as nanoparticles for a template. For the alumina nanoparticles, the average particle diameter do was found from an equation: $d_0[nm]=6/(S_{BET} \times \rho) \times 10^9$, where the BET specific surface area is denoted as S [$m^2/g$] and the density of alumina is denoted as $\rho$ [$g/m^2$], and the average particle diameter do of the alumina nanoparticles was found to be $d_0=14$ nm.

<Coating Step>

In the coating step, methane was used as the source gas, argon was used as the process gas, chemical vapor deposition was performed under the condition of 900° C. for 2 hours, the flow rate of the methane gas was then maintained at 0 ml/min for 30 minutes, and the system was allowed to cool naturally to room temperature.

<Separation Step>

Subsequently, a molding obtained by the coating step and hydrofluoric acid were put and mixed in a beaker and stirred at room temperature for two hours. The molding separated from the template was taken out, and the sample was washed with pure water for five times while being filtrated using a membrane filter (0.1 μm) and then subjected to suction filtration. Then, in the same manner as above, again, the molding and hydrofluoric acid were mixed and stirred, and the molding was subjected to suction filtration using pure water.

Subsequently, the molding was put in a screw tube bottle containing acetone, the lid was closed, and the mixture was well shaken. The screw tube bottle was then allowed to stand at 60° C. overnight within a constant-temperature dryer. On the next day, the supernatant was discarded, acetone was newly added, and the screw tube bottle was allowed to stand at 60° C. for 3 hours within a constant-temperature dryer. Subsequently, the supernatant was discarded, acetone was newly added, and the screw tube bottle was again allowed to stand at 60° C. for 3 hours within a constant-temperature dryer. Then, acetone was removed by suction filtration, drying under reduced pressure was performed twice at 1000 Pa or less for 10 hours at 150° C. using the constant-temperature dryer, and thereby carbon mesosponge (CMS) was fabricated as the molding.

<Stabilization Step>

Subsequently, the CMS was placed in a sample chamber of a high-temperature heating furnace (IZUMI Tech, IZU-SMS005), the sample chamber was vacuumed, the temperature thereof was then raised to 1800° C. at a temperature rise rate of 15° C./min while an argon gas was flowing at 10 ml/min, heat treatment was performed at 1800° C. for 1 hour to sinter the CMS, and a graphene mesosponge (GMS) was fabricated as the carbon material.

Example 2

The carbon material was fabricated by the same method as in Example 1 except that alumina nanoparticles (TAIMEI CHEMICALS CO., LTD., TM-300) was used as the nanoparticles for the template and that the temperature of the heat treatment in the stabilization step was changed to 1600° C. For the above alumina nanoparticles, the average particle diameter was measured by the same method as in Example 1 and found to be 7 nm.

Example 3

The carbon material was fabricated by the same method as in Example 1 except that alumina nanoparticles (TAIMEI CHEMICALS CO., LTD., TM-300) were used as the nanoparticles for the template. Note that the alumina nanoparticles used in Example 3 were the same as those used in Example 2.

Example 4

The carbon material was fabricated by the same method as in Example 1 except that alumina nanoparticles (Sasol Chemicals, product name: SBa-200) were used as the nanoparticles for the template. For the above alumina nanoparticles, the average particle diameter was measured by the same method as in Example 1 and found to be 8 nm.

Example 5

The carbon material was fabricated by the same method as in Example 1 except that magnesium oxide nanoparticles (US Research Nanomaterials, model: Magnesium Oxide MgO Nanopowder/Nanoparticles (MgO, 99+%, 20 nm)) were used as the nanoparticles for the template, that the condition of the coating step was changed, and that hydrochloric acid was used in place of hydrofluoric acid in the separation step. For the above magnesium oxide nanoparticles, the average particle diameter was measured by the same method as in Example 1 and found to be 30 nm.

In Example 5, in the coating step, the flow rates of the methane gas and the argon gas were changed, respectively, and the amount of coating was adjusted. Further, the treatment time under the condition of 900° C. was changed to 50 minutes. Other conditions in the coating step were the same as those in Example 1.

Comparative Example 1

In Comparative example 1, zeolite template carbon (ZTC) was fabricated as a carbon material by the following method.

First, in a round-bottom flask whose pressure was reduced by a vacuum pump, 15 g of Y-type zeolite (TOSOH CORPORATION, HZS-320NAA) dried overnight in a heated environment at 150° C. was impregnated with furfuryl alcohol (FA), and FA/zeolite composite was obtained. Subsequently, the FA/zeolite composite was put in a quartz reaction tube, subjected to heat treatment at 80° C. for 24 hours under $N_2$ flow, and then maintained at 150° C. for 8 hours, and thereby poly-furfuryl alcohol (PFA)/zeolite composite was obtained.

Subsequently, the above PFA/zeolite composite was used as the template to coat a carbon layer on the template. Specifically, 15 g of the PFA/zeolite composite was put in a horizontal CVD device, and a carbon layer was coated on the PFA/zeolite composite by chemical vapor deposition of maintaining the maximum temperature of 700° C. for 2 hours under $N_2$ flow containing 4 vol % of propane. Subsequently, the introduction of the propane gas was stopped, heat treatment was performed at 900° C. for 3 hours under $N_2$ flow, and zeolite/carbon composite was obtained.

Subsequently, the above zeolite/carbon composite was treated by hydrofluoric acid (HF) to remove zeolite that was the template, and the ZTC was obtained.

Comparative Example 2

ZTC was fabricated as the carbon material by the same method as in Comparative example 1 except that the fabrication conditions of the zeolite/carbon composite were changed.

In Comparative example 2, first, 15 g of the same Y-type zeolite as used in Comparative example 1 was dried in vacuum at 150° C. overnight. Subsequently, the Y-type zeolite was installed as the template in a rotary kiln type CVD device and subjected to chemical vapor deposition at the maximum temperature 600° C. for 4 hours under an argon gas flow containing 15 vol % of acetylene, and a carbon layer was coated on the template. Subsequently, the introduction of the acetylene gas was stopped, heat treatment was performed at 900° C. for 3 hours under $N_2$ flow in the same manner as in Comparative example 1, and a zeolite/carbon composite having the stabilized carbon framework structure was obtained. Subsequently, the template was removed by the same method as in Comparative example 1, and the ZTC was obtained.

Comparative Example 3

ZTC was fabricated as the carbon material by the same method as in Comparative example 1 except that the fabrication conditions of the zeolite/carbon composite were changed.

In Comparative example 3, first, 0.5 g of X-type zeolite (Union Showa K. K., molecular sieve 13x powder) was dried in vacuum at 150° C. for 6 hours. Subsequently, 0.5 g of the X-type zeolite was installed as the template in a quartz reaction tube, and subjected to chemical vapor deposition at 600° C. for 4 hours under $N_2$ flow containing 15 vol % of acetylene, and a carbon layer was coated on the template. Subsequently, the introduction of the acetylene gas was stopped, heat treatment was performed at 850° C. for 3 hours, and a zeolite/carbon composite having the stabilized carbon framework structure was obtained. Subsequently, the template was removed by the same method as in Comparative example 1, and the ZTC was obtained.

Comparative Example 4

A molding that is the CMS of the precursor of the GMS was obtained by the same method as in Example 1 except that the stabilization step was not performed.

Comparative Example 5

A molding that is the CMS as the precursor of the GMS was obtained by the same method as in Examples 2 and 3 except that the stabilization step was not performed.

Comparative Example 6

A molding that is the CMS as the precursor of the GMS was obtained by the same method as in Example 4 except that the stabilization step was not performed.

Comparative Example 7

A molding that is the CMS as the precursor of the GMS was obtained by the same method as in Comparative example 6 except that the following hot press step was performed.

First, a molding in a state where a carbon layer was coated on a template was fabricated in the same method as in Comparative example 6. Subsequently, the molding was put in a mold, and the mold was installed in a hot press device (SHIMADZU CORPORATION, AG-50 kNXDp). Subsequently, a pressure was applied at room temperature at a sliding rate of 0.01 mm/sec under vacuum, and temperature rise was started when the pressure reached 30 MPa. When the temperature reached 600° C., the pressure and the temperature were maintained for 3 hours, and after sufficiently cooled, the molding was taken out. Subsequently, the template was removed by the same method as in Comparative example 6, and the molding that is the CMS as the precursor of the GMS was obtained.

Comparative Example 8

A molding that is the CMS as the precursor of the GMS was obtained by the same method as in Comparative example 6 except that the conditions of the coating step were changed.

In the coating step in Comparative example 8, first, chemical vapor deposition was performed on alumina nanoparticles under the condition of 650° C. for 200 minutes by causing argon to flow at a flow rate of 225 ml/min in an acetonitrile solvent, a carbon layer of the graphene framework doped with nitrogen was coated on the template, and a molding was obtained. Subsequently, the molding was subjected to heat treatment at 1800° C. for 1 hour and then allowed to cool naturally to room temperature. The CMS as the precursor of the GMS was fabricated.

Comparative Example 9

As Comparative example 9, a single-layer carbon nanotube (SWCNT) (ZEON Corporation, model: SG101) was prepared.

Comparative Example 10

As Comparative example 10, activated carbon (Kansai Coke and Chemicals Company, Limited, MSC-30) was prepared. MSC-30 is a petroleum coke-based material synthesized by alkaline activation.

Comparative Example 11

As Comparative example 11, activated carbon (Osaka Gas Chemicals Co., Shirasagi-P) was prepared. Shirasagi-P is a woody-based material synthesized by steam activation.
[Characteristics Evaluation]
For the carbon materials of Examples 1 to 5 and Comparative examples 1 to 11, the characteristics were evaluated by the following methods.
<Measurement by Bulk Modulus K, Mercury Intrusion Method>

Figure 6A:
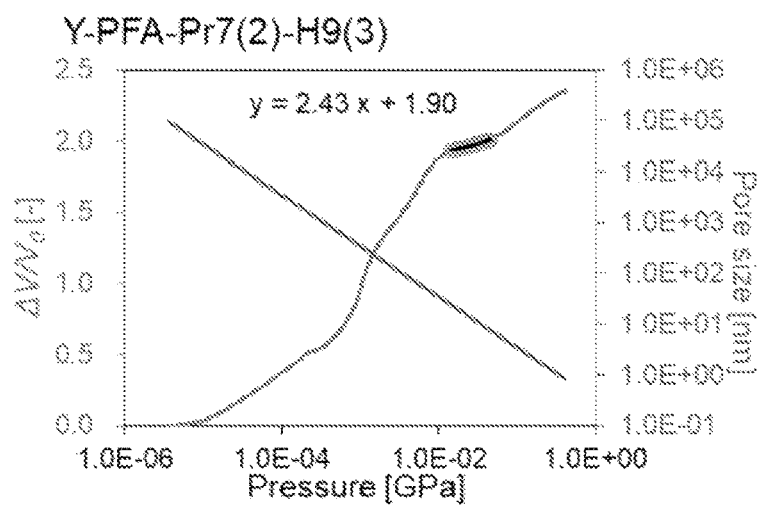
FIG. 6A is a graph illustrating a result of mercury intrusion measurement of Comparative example 1.
Figure 6B:
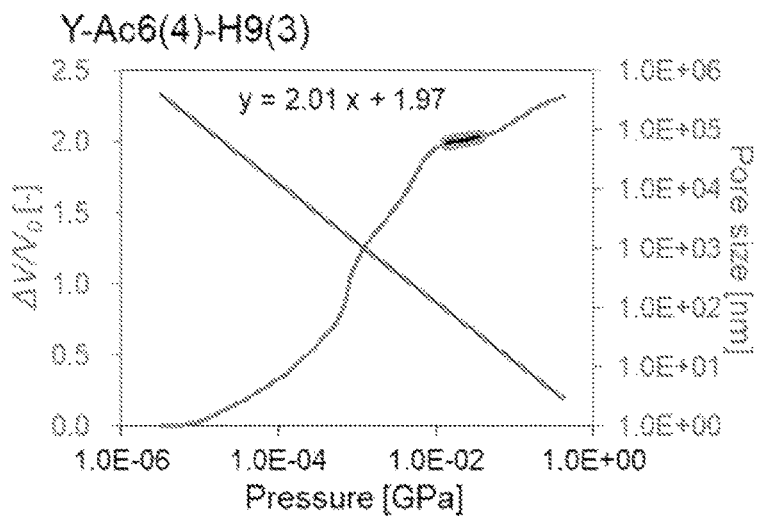
FIG. 6B is a graph illustrating a result of mercury intrusion measurement of Comparative example 2.
Figure 6C:
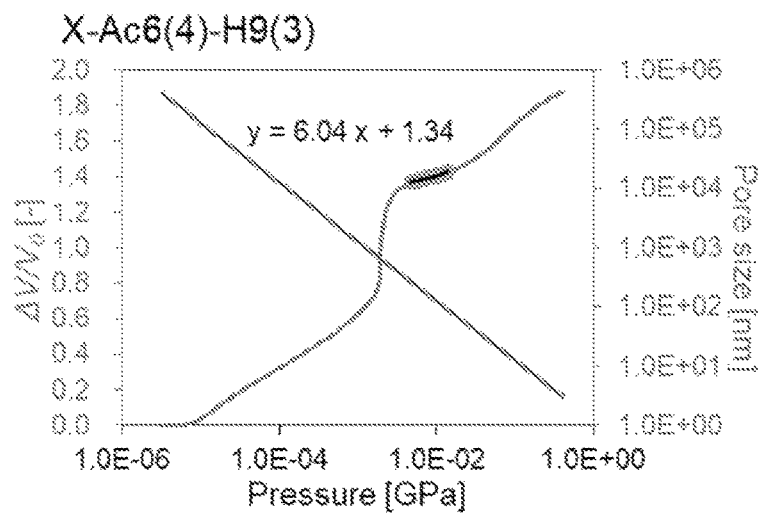
FIG. 6C is a graph illustrating a result of mercury intrusion measurement of Comparative example 3.
Figure 7A:
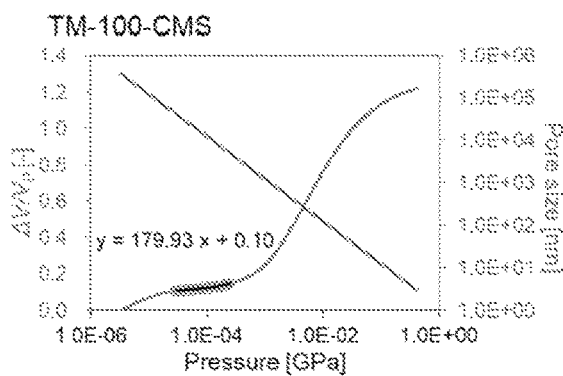
FIG. 7A is a graph illustrating a result of mercury intrusion measurement of Comparative example 4.
Figure 7B:
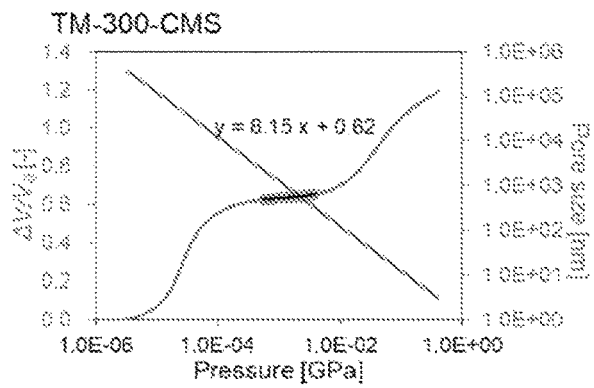
FIG. 7B is a graph illustrating a result of mercury intrusion measurement of Comparative example 5.
Figure 7C:
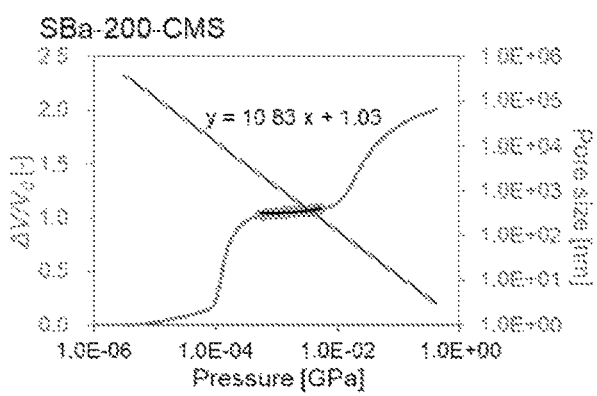
FIG. 7C is a graph illustrating a result of mercury intrusion measurement of Comparative example 6.
Figure 7D:
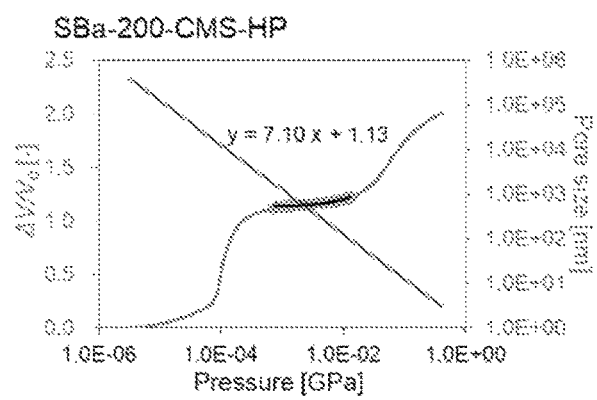
FIG. 7D is a graph illustrating a result of mercury intrusion measurement of Comparative example 7.
Figure 7E:
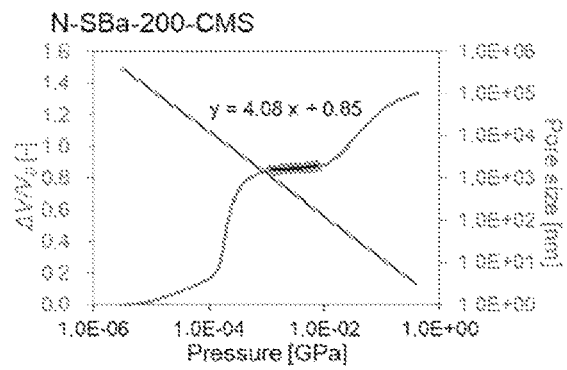
FIG. 7E is a graph illustrating a result of mercury intrusion measurement of Comparative example 8.
Figure 8A:
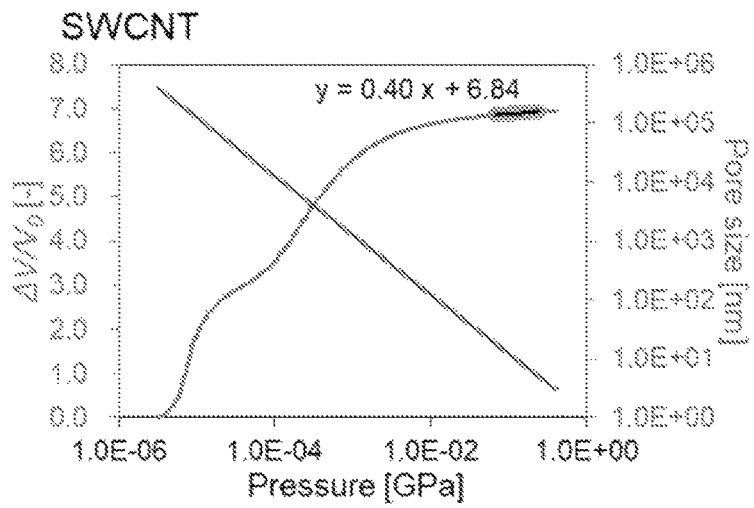
FIG. 8A is a graph illustrating a result of mercury intrusion measurement of Comparative example 9.
Figure 8B:
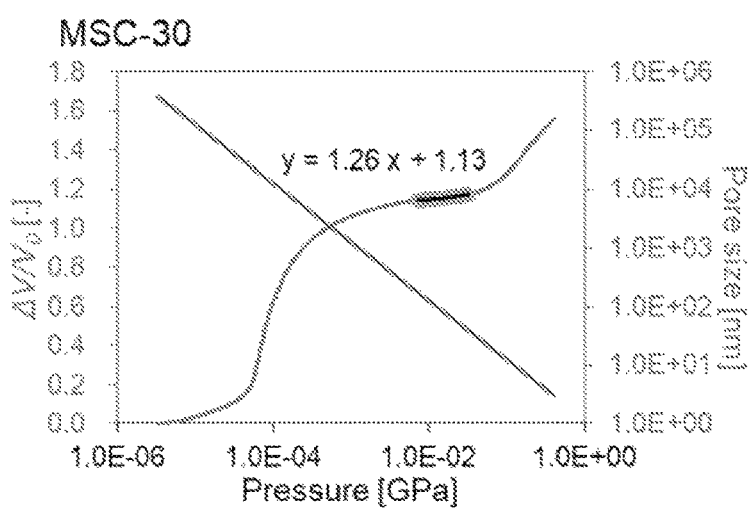
FIG. 8B is a graph illustrating a result of mercury intrusion measurement of Comparative example 10.
Figure 8C:
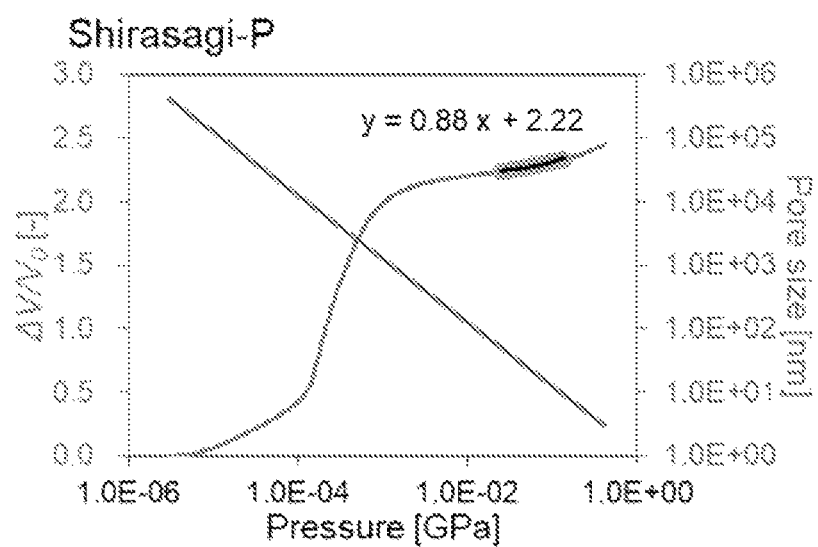
FIG. 8C is a graph illustrating a result of mercury intrusion measurement of Comparative example 11.

First, a sample was put in a vacuum container, mercury was introduced therein, an isostatic pressure was applied to the sample in a range from 3 Kpa to 400 MPa, and a correlation curve between volume change $\Delta V$ and pressure P of the mercury contained in the vacuum container was obtained. Under a low pressure condition, the volume of mercury is rapidly reduced due to impregnation in interparticle spaces, and $\Delta V$ is rapidly reduced. The correlation curve between volume change rate $\Delta V/V_0$ and pressure P was plotted based on the above result and the initial volume $V_0$ of the sample. FIG. 5A to FIG. 5E are graphs illustrating results of mercury intrusion measurement of Example 1 to Example 5, FIG. 6A to FIG. 6C are graphs illustrating results of mercury intrusion measurement of Comparative example 1 to Comparative example 3, FIG. 7A to FIG. 7E are graphs illustrating results of mercury intrusion measurement of Comparative examples 4 to 8, and FIG. 8A to FIG. 8C are graphs illustrating results of mercury intrusion measurement of Comparative examples 9 to 11. For definition of the bulk modulus K, a range with good linearity in each measured graph was used where agglomeration of primary particles or intrusion of mercury into pores did not appear to occur.

In the mercury intrusion measurement, it is considered that, in a range where a rapid volume change occurs, agglomeration of primary particles or intrusion of mercury into pores occurs, and it is thus considered to be preferable that a range with small linearity where no rapid volume change occurs be used for calculation. Thus, in the calculation of the bulk modulus based on a result of mercury intrusion measurement, a range where only compression of a sample occurs except for a range where mercury intrudes between particles or into pores of the sample was used as a stress-distortion curve (bold line part in the drawings). The bulk modulus K was calculated from Equation (4) below based on the stress-distortion curve. In the equation, $V_0$ denotes a volume of mercury at a certain mercury pressure P, and $\Delta V$ denotes a volume change when the mercury pressure increases by $\Delta P$ and exhibits a negative value.

$$K = -V_0(\Delta P/\Delta V) \qquad (4)$$

Figure 5A:
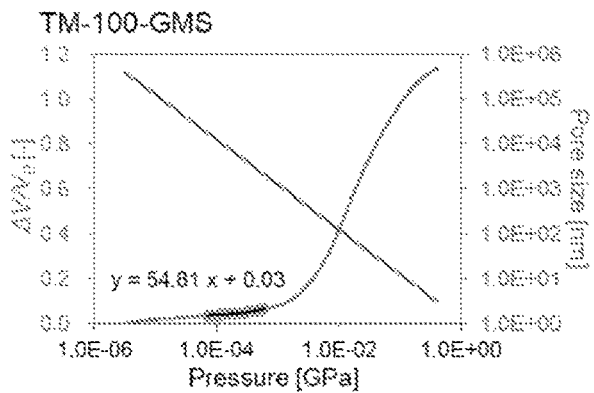
FIG. 5A is a graph illustrating a result of mercury intrusion measurement of Example 1.
Figure 5B:
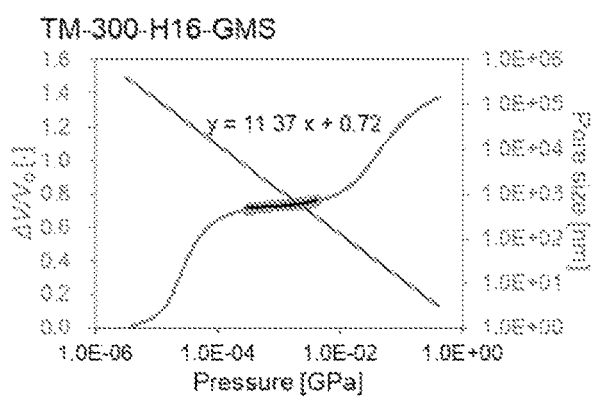
FIG. 5B is a graph illustrating a result of mercury intrusion measurement of Example 2.
Figure 5C:
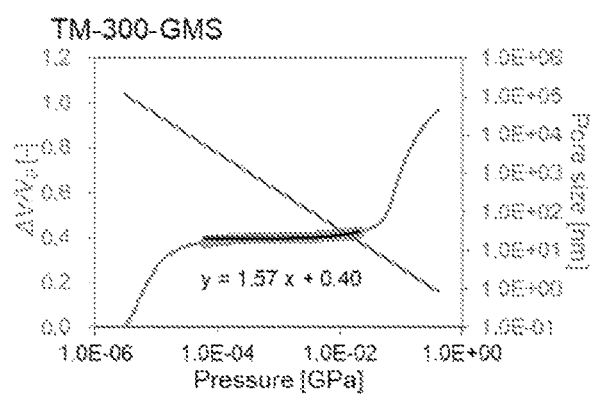
FIG. 5C is a graph illustrating a result of mercury intrusion measurement of Example 3.
Figure 5D:
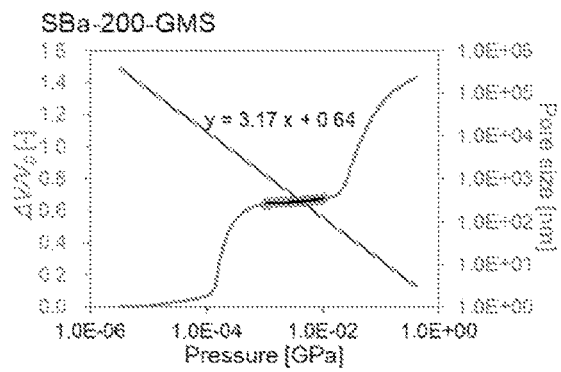
FIG. 5D is a graph illustrating a result of mercury intrusion measurement of Example 4.
Figure 5E:
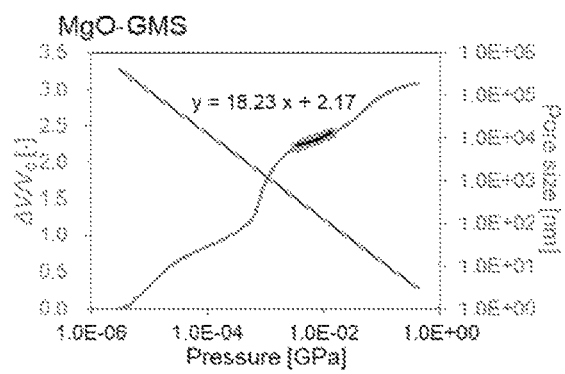
FIG. 5E is a graph illustrating a result of mercury intrusion measurement of Example 5.

All of Example 1 to Example 5, the measurement results of which are illustrated in FIG. 5A to FIG. 5E, are Examples in which the GMS was fabricated and measured and represent a meso-porous material, and therefore have a relatively small pressure range where intrusion of mercury into pores occurs. The same applies for the CMS illustrated in FIG. 7A to FIG. 7E. In contrast, ZTC illustrated in FIG. 6A to FIG. 6C is a micro-porous material and thus has a relatively large pressure range where mercury intrudes into pores. Further, Example 1, the results of which are shown in FIG. 5A, and Comparative Example 4, the results of which are shown in FIG. 7A, do not show the behavior of mercury entering between the particles. The region around $5.0 \times 10^{-5}$ GPa to $5.0 \times 10^{-3}$ GPa where the change in the volume change rate with respect to pressure is gentle was used to calculate the volume modulus. In Comparative example 9, the measurement result of which is illustrated in FIG. 8A, since no behavior of intrusion of mercury into the tube was observed, a region to be used as a pressure-distortion curve was determined based on the inner diameter of the SWCNT observed by TEM. In Comparative example 10, the measurement result of which is illustrated in FIG. 8B, a rapid volume change occurs in regions of 0.0001 to 0.01 GPa and 0.1 GPa or greater. Further, in Comparative example 11, the measurement result of which is illustrated in FIG. 8C, since the pore diameter is small, no intrusion of mercury into pores occurs, and a range of $2.4 \times 10^{-2}$ to $1.3 \times 10^{-1}$ GPa was used for the calculation by the pore diameter distribution.

<Evaluation of Average Graphene Domain Size L, Measurement of Edge Site Amount>

Next, for Examples 1 to 6 and Comparative examples 4 to 8, the average graphene domain size L was calculated by using the coronene model. The average graphene domain size L is a size of one graphene sheet forming a carbon material and is calculated by using Equation (5) below. In the equation, $N_{edge}$ denotes an average edge site amount in a carbon material, and $a_0$ denotes a lattice constant in the a-axis direction of the carbon material (0.2461 nm).

$$L = (a_0/N_{edge}) \qquad (5)$$

Figure 9:
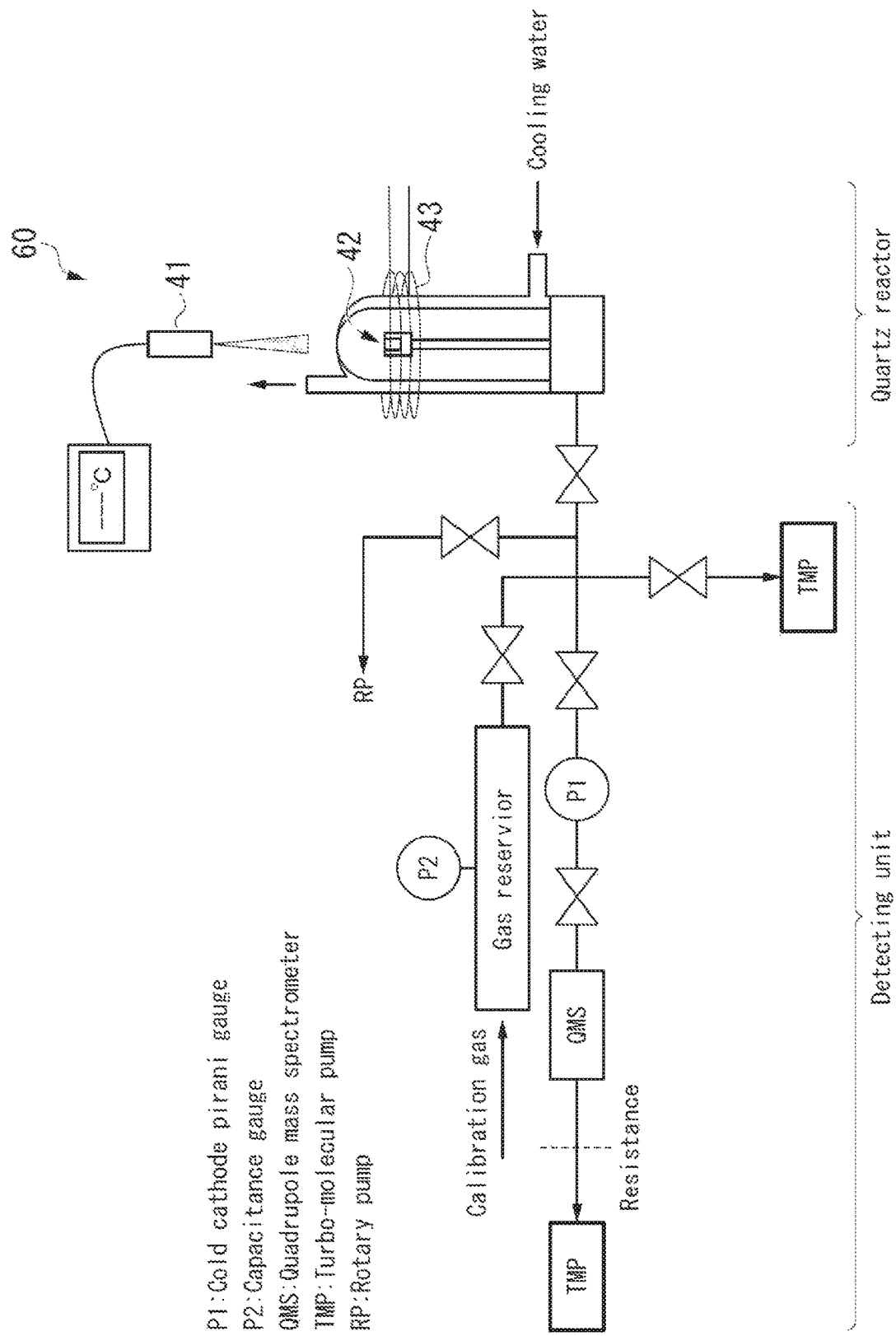
FIG. 9 is a diagram illustrating an ultra-sensitive vacuum TPD device 60 used in temperature-programmed desorption analysis.
Figure 10A:
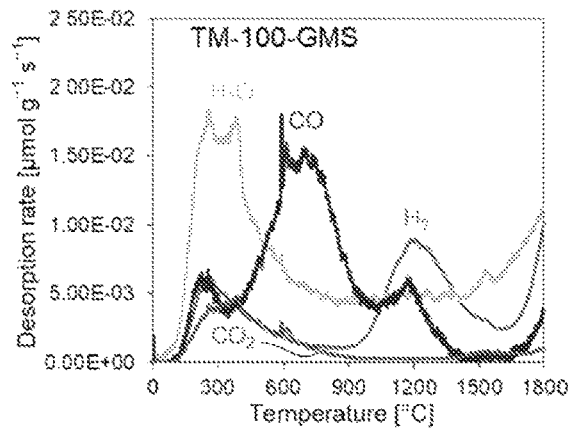
FIG. 10A represents gas generation patterns of Example 1 when temperature-programmed desorption analysis is performed.
Figure 10B:
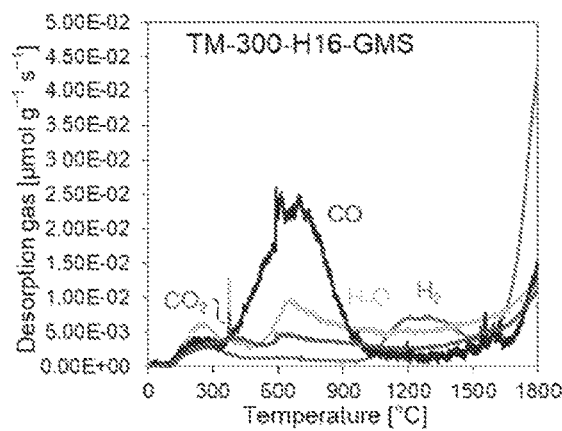
FIG. 10B represents gas generation patterns of Example 2 when temperature-programmed desorption analysis is performed.
Figure 10C:
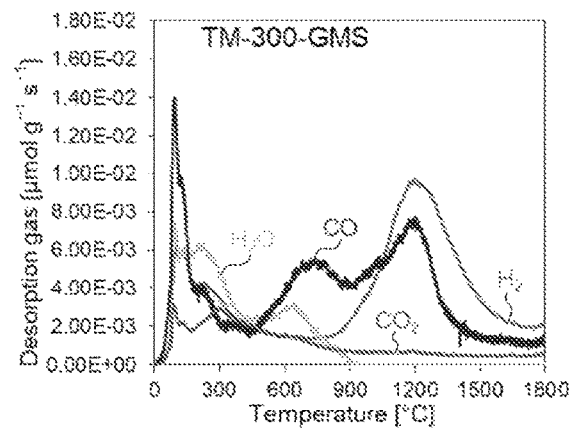
FIG. 10C represents gas generation patterns of Example 3 when temperature-programmed desorption analysis is performed.
Figure 10D:
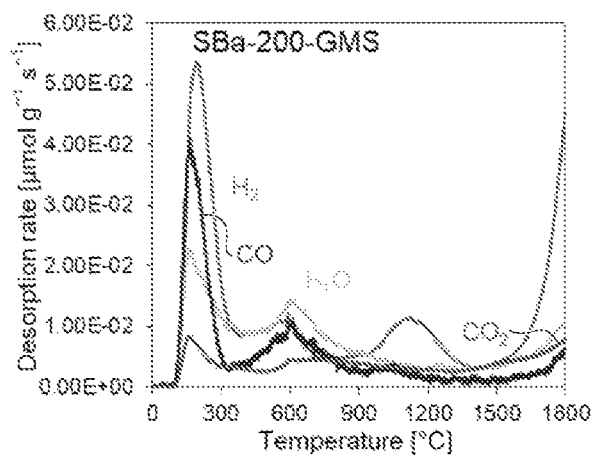
FIG. 10D represents gas generation patterns of Example 4 when temperature-programmed desorption analysis is performed.
Figure 10E:
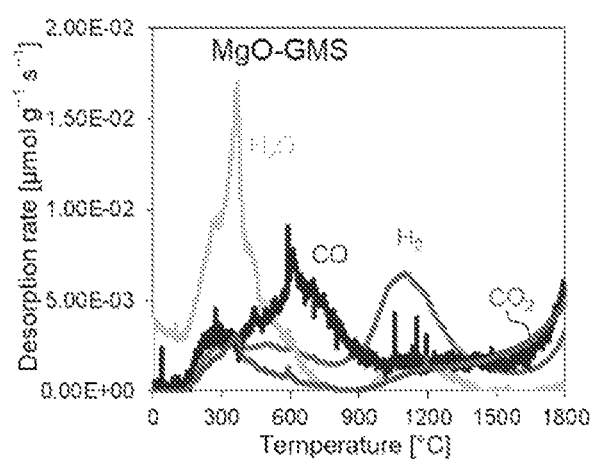
FIG. 10E represents gas generation patterns of Example 5 when temperature-programmed desorption analysis is performed.

The average edge site amount $N_{edge}$ in a carbon material was measured by a temperature-programmed desorption method (TPD method) by using an ultra-sensitive vacuum TPD device (developed by Tohoku University, see T. Ishii et al., CARBON, 80, 2014, 135-145). FIG. 9 is a diagram illustrating an ultra-sensitive vacuum TPD device 60 used in the temperature-programmed desorption analysis. The ultra-sensitive vacuum TPD device 60 has a quartz reactor having a radiation thermometer 41, a sample holder 42, and a high-frequency induction coil 43 and a detecting unit connected to the quartz reactor. The detecting unit has, for example, a gas reservoir, a turbo molecular pump TMP, a rotary pump RP, a cold cathode Pirani gauge P1, and a capacitance gauge P2. Specifically, in accordance with the method described in the reference mentioned above, first, about 1 mg of a sample was placed on the sample holder and heated up to 1800° C. at a temperature rise rate of 10° C./min under high vacuum of about $1.0 \times 10^{-5}$ Pa, and a gas desorbed from the sample was quantified by a mass spectrometer. The quantification of the desorbed gas was performed by quantifying $H_2$, $H_2O$, CO, and $CO_2$. Herein, measurement data was corrected by blank data measured for only the sample holder.

Figure 11A:
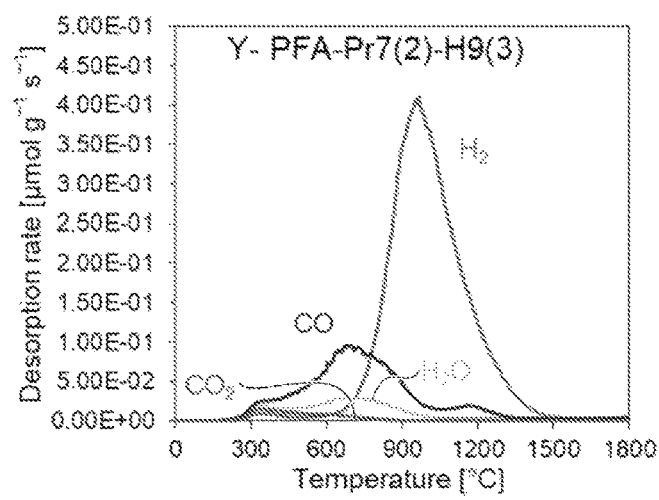
FIG. 11A represents a gas generation pattern of Comparative example 1.
Figure 11B:
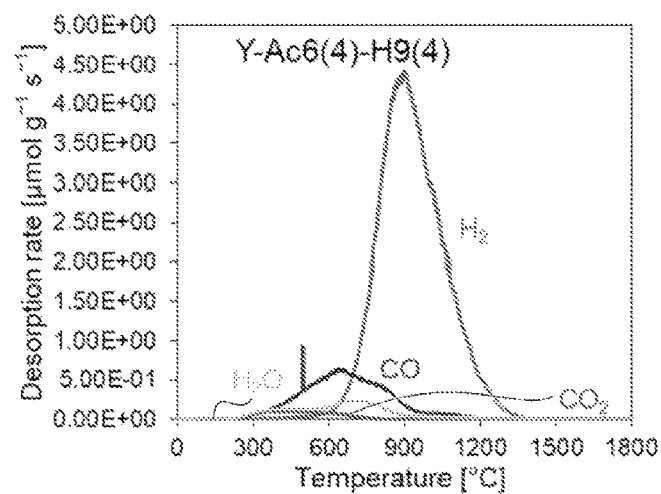
FIG. 11B represents a gas generation pattern of Comparative example 2.
Figure 11C:
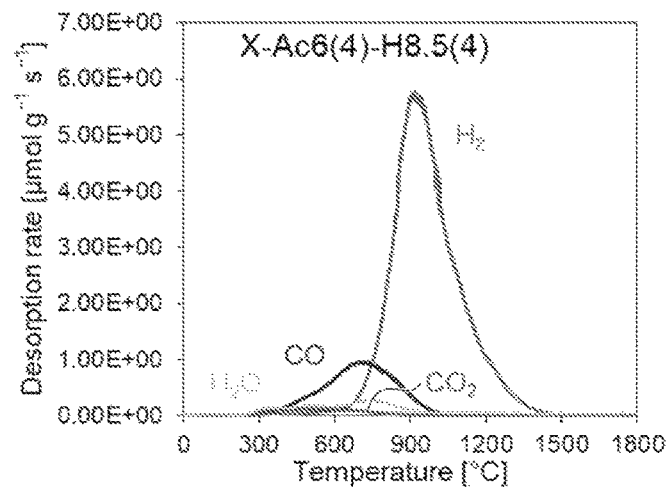
FIG. 11C represents a gas generation pattern of Comparative example 3.
Figure 12A:
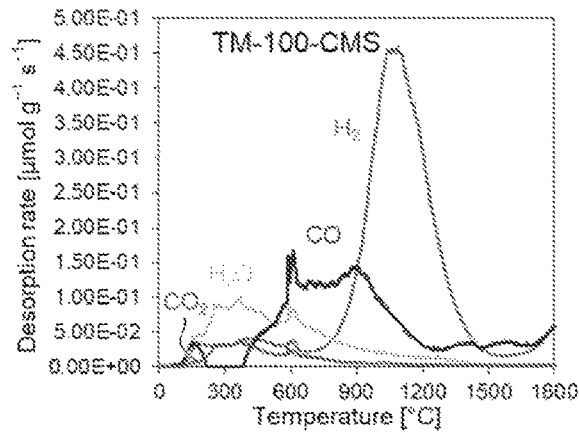
FIG. 12A represents a gas generation pattern of Comparative example 4.
Figure 12B:
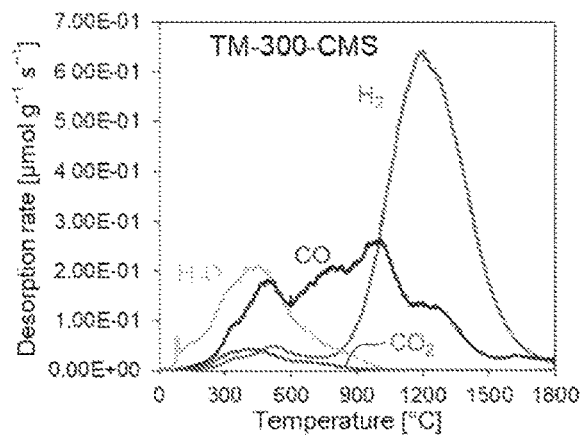
FIG. 12B represents a gas generation pattern of Comparative example 5.
Figure 12C:
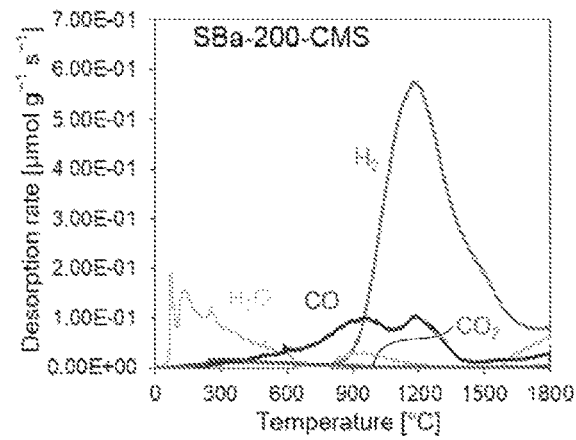
FIG. 12C represents a gas generation pattern of Comparative example 6.
Figure 12D:
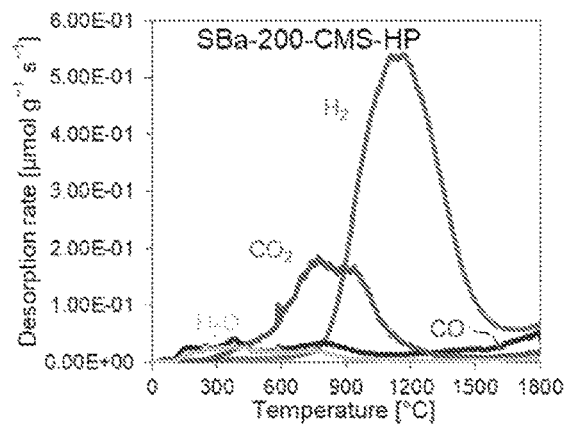
FIG. 12D represents a gas generation pattern of Comparative example 7.
Figure 12E:
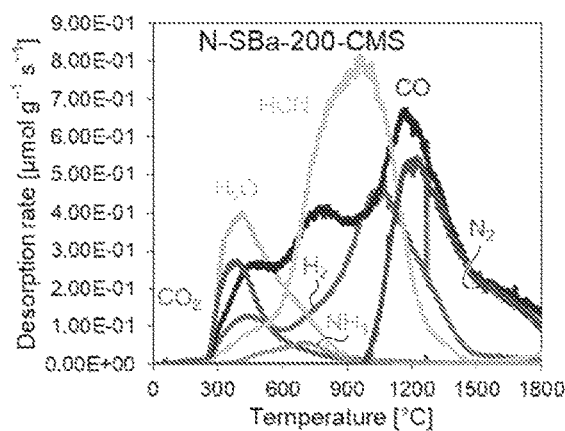
FIG. 12E represents a gas generation pattern of Comparative example 8.
Figure 13A:
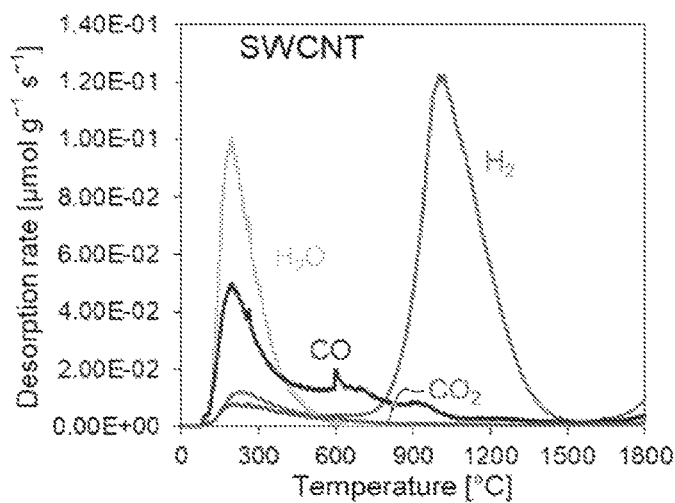
FIG. 13A represents a gas generation pattern of Comparative example 9.
Figure 13B:
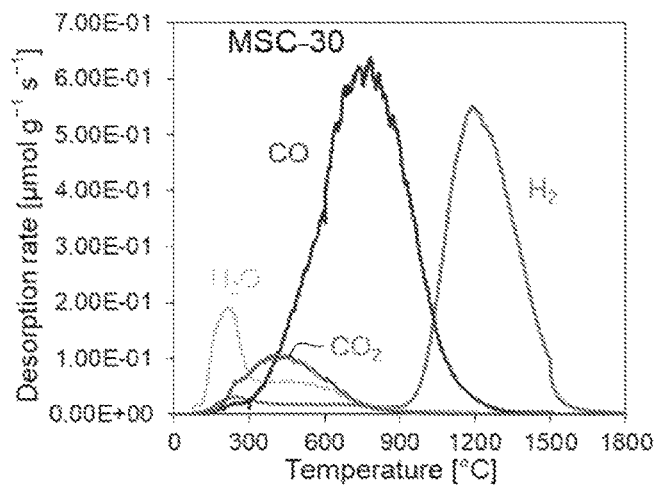
FIG. 13B represents a gas generation pattern of Comparative example 10.
Figure 13C:
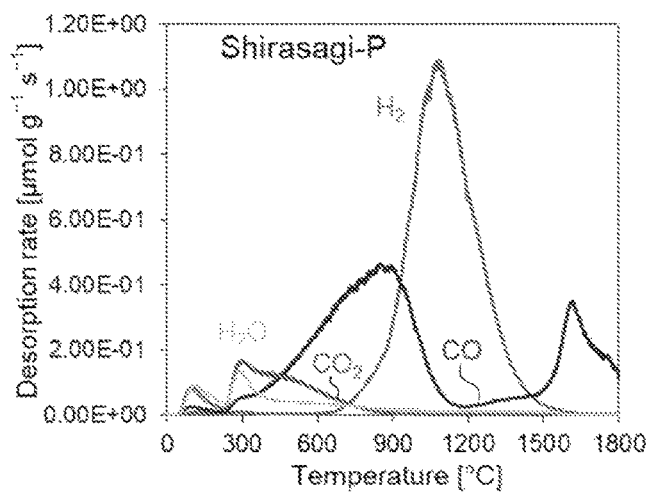
FIG. 13C represents a gas generation pattern of Comparative example 11.

FIG. 10A to FIG. 10E represent gas generation patterns when temperature-programmed desorption analysis was performed on Example 1 to Example 5, FIG. 11A to FIG. 11C represent gas generation patterns for Comparative example 1 to Comparative example 3, FIG. 12A to FIG. 12E represent gas generation patterns for Comparative examples 4 to 8, and FIG. 13A to FIG. 13C represent gas generation patterns for Comparative examples 9 to 11.

The edge site amount $N_{edge}$ [µmol/g] was quantified by using Equation (6) below. In the equation, $N_{H2}$, $N_{H2O}$, $N_{CO}$, and $N_{CO2}$ denote an amount of desorbed hydrogen, an amount of desorbed water, an amount of desorbed carbon monoxide, and an amount of desorbed carbon dioxide measured by the TPD method, respectively.

$$N_{edge} = 2 \times N_{H2} + 2 \times N_{H2O} + N_{CO} + N_{CO2} \qquad (6)$$

[Measurement of Edge Site Specific Surface Area Sedge]

Furthermore, the edge site specific surface areas Sedge of Example 1 to Example 5 and Comparative example 1 to Comparative example 11 were calculated from Equation (7) below by using the edge site amount $N_{edge}$ described above. In the equation, $N_{edge}$ denotes an edge site amount of a carbon material, $A_{edge}$ denotes a specific surface area per edge site, and NA denotes the Avogadro's constant. The value $A_{edge}$ is an average occupied area geometrically calculated from the crystal structure of graphite, and the fact that the value $A_{edge}$ is 0.083 nm² was utilized.

$$S_{edge} = N_{edge} \times A_{edge} \times N_A \qquad (7)$$

Further, doped nitrogen is categorized into pyrrole type, pyridine type, and quaternary nitrogen. Doped nitrogen is desorbed as $N_2$, HCN, and $NH_3$, and quaternary nitrogen that is nitrogen in graphene domain of the above category is desorbed as $N_2$ when being at 900° C. or higher. Thus, the nitrogen content N in graphene domain is calculated by quantifying $N_2$ at 900° C. or higher based on Equation (8) below. In the equation, $N_{N2}$ (>900° C.) means the amount of $N_2$ desorbed at 900° C. or higher.

$$N = N_{N2}(> 900° \text{ C.}) \times 10^{-6} \times 28.0 \times 100 \qquad (8)$$

[Average Number of Stacking Layers n, Nitrogen Adsorption/Desorption Measurement]

Nitrogen adsorption/desorption measurement was performed on the carbon materials of Example 1 to Example 5 and Comparative example 1 to Comparative example 11, and the BET specific surface area S of the carbon material was found. Subsequently, the average number of stacking layers n of the carbon material was calculated by calculating the ratio of the graphene theoretical specific surface area $S_{graphene}$ to the difference between the BET specific surface area S of the carbon material and the edge site specific surface area Sedge from Equation (1) above. The graphene theoretical specific surface area $S_{graphene}$ was 2627 m²/g. The BET specific surface area S of the carbon material was calculated by the following nitrogen adsorption/desorption measurement. Herein, the BET specific surface area S of the carbon material was found by the BET method.

Figure 14A:
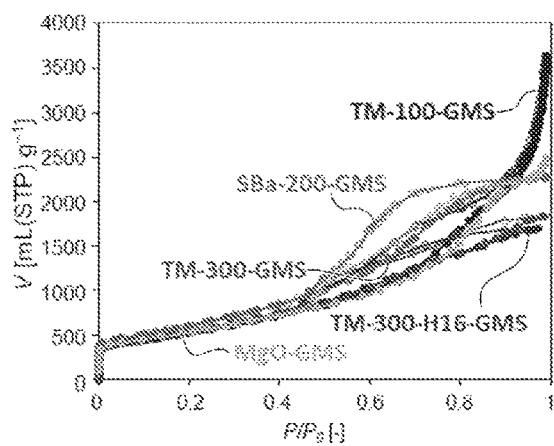
FIG. 14A represents nitrogen adsorption/desorption isotherms of Example 1 to Example 5.
Figure 14B:
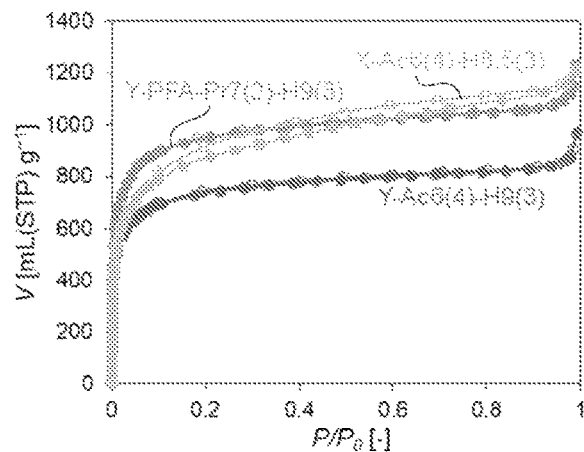
FIG. 14B represents nitrogen adsorption/desorption isotherms of Comparative example 1 to Comparative example 3.
Figure 14C:
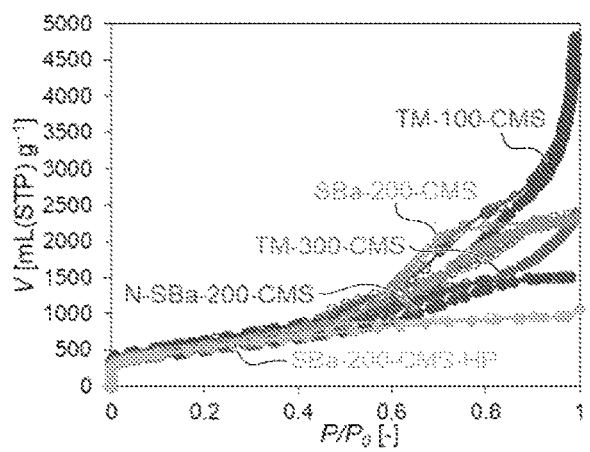
FIG. 14C represents nitrogen adsorption/desorption isotherms of Comparative example 4 to Comparative example 8.
Figure 14D:
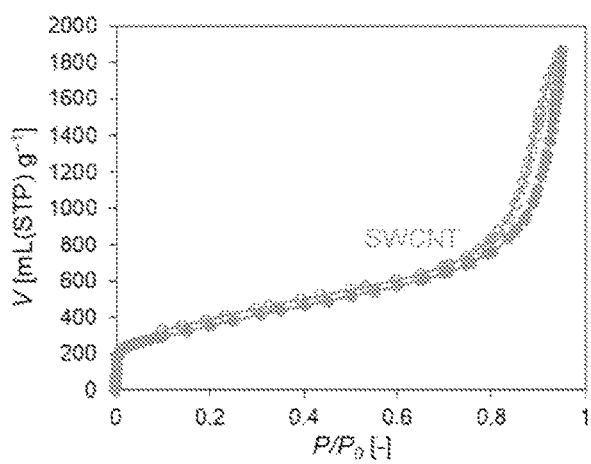
FIG. 14D represents a nitrogen adsorption/desorption isotherm of Comparative example 9.
Figure 14E:
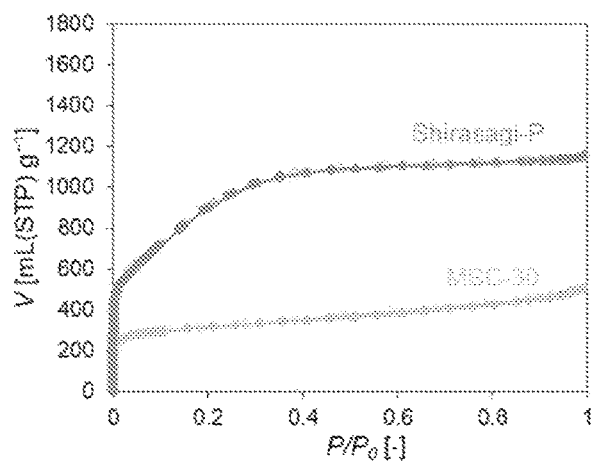
FIG. 14E represents nitrogen adsorption/desorption isotherms of Comparative example 10 and Comparative example 11.

The nitrogen adsorption/desorption measurement was performed under the condition of −196° C. by using a specific surface area and pore distribution measurement device (BELSORP max, BEL Japan). Before measurement, deaeration treatment for vacuum drying was performed at 150° C. for 6 hours. The equilibrium determination condition in measuring the pressure in the sample tube was 300 seconds. FIG. 14A represents nitrogen adsorption/desorption isotherms of Example 1 to Example 5, FIG. 14B represents nitrogen adsorption/desorption isotherms of Comparative example 1 to Comparative example 3, FIG. 14C represents nitrogen adsorption/desorption isotherms of Comparative example 4 to Comparative example 8, FIG. 14D represents a nitrogen adsorption/desorption isotherm of Comparative example 9, and FIG. 14E represents nitrogen adsorption/desorption isotherms of Comparative example 10 and Comparative example 11. In FIG. 14A to FIG. 14E, graphs having circles filled in represent nitrogen adsorption isotherms, and graphs having circles not filled in represent nitrogen desorption isotherms.

[Pore volume $V_{total}$]

The pore volume $V_{total}$ was measured by converting a nitrogen adsorption amount at a relative pressure $P/P_0=0.96$ at −196° C. into a volume for a liquid nitrogen density based on the nitrogen adsorption/desorption isotherm.

[Pore Diameter Distribution]

Figure 15A:
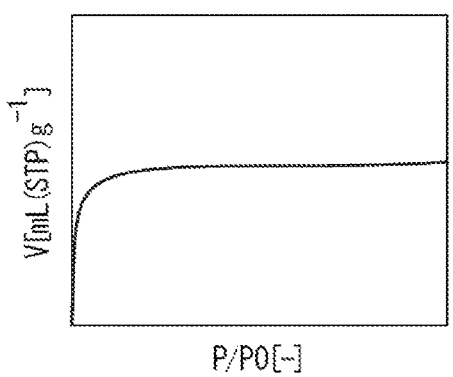
FIG. 15A is a schematic diagram of a type I adsorption/desorption isotherm.
Figure 15B:
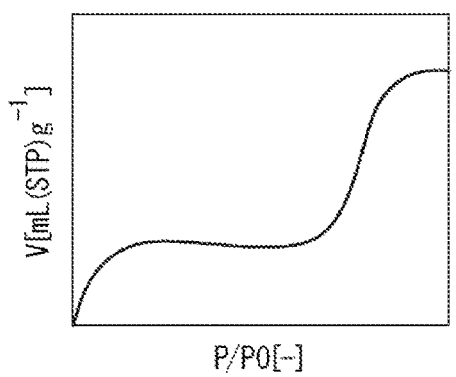
FIG. 15B is a schematic diagram of a type IV adsorption/desorption isotherm.
Figure 16A:
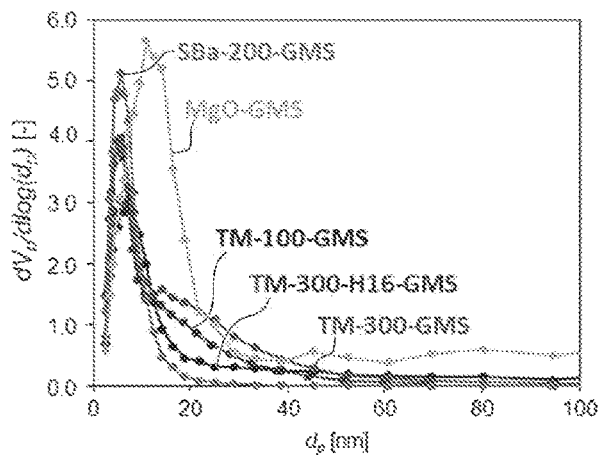
FIG. 16A represents pore diameter distributions of Example 1 to Example 5.
Figure 16B:
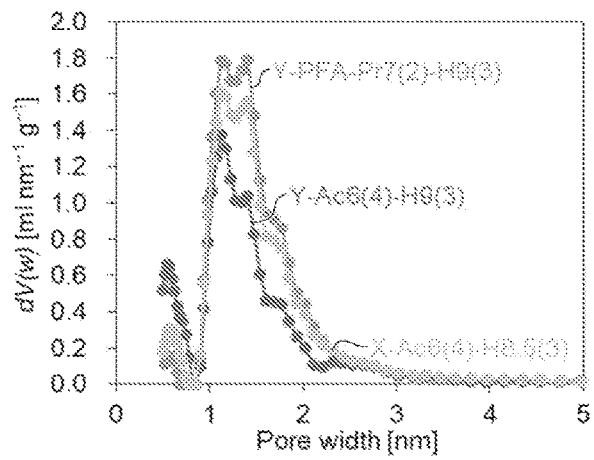
FIG. 16B represents pore diameter distributions of Comparative example 1 to Comparative example 3.
Figure 16C:
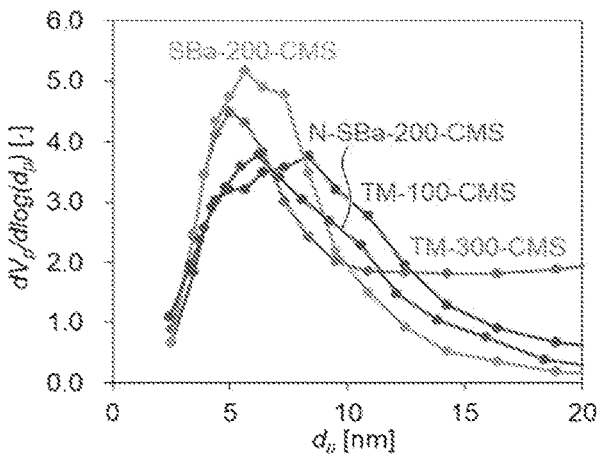
FIG. 16C represents pore diameter distributions of Comparative example 4 to Comparative example 8.
Figure 16D:
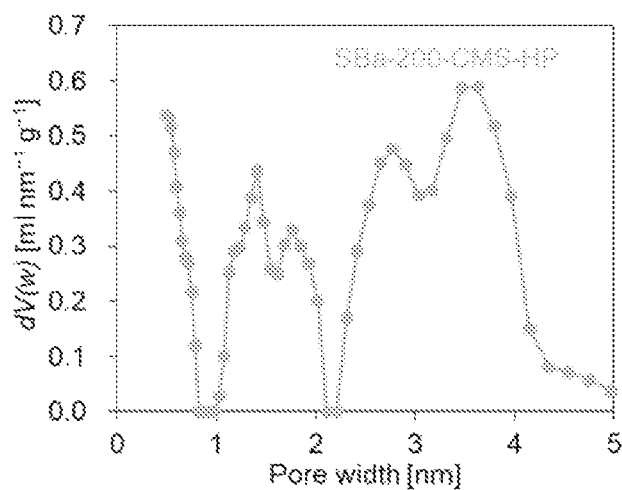
FIG. 16D represents a pore diameter distribution of Comparative example 9.
Figure 16E:
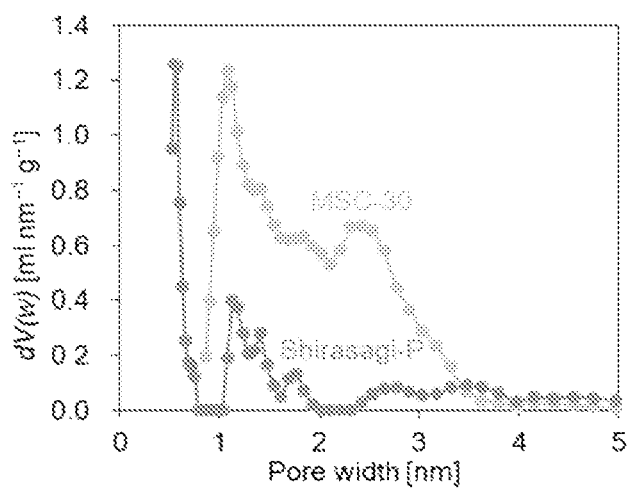
FIG. 16E represents pore diameter distributions of Comparative example 10 and Comparative example 11.

Adsorption isotherm is generally categorized into two types of type I and type IV. FIG. 15A and FIG. 15B illustrate schematic diagrams each illustrating a general shape of an adsorption isotherm, FIG. 15A illustrates a schematic diagram of the type I adsorption isotherm, and FIG. 15B illustrates a schematic diagram of the type IV adsorption isotherm. Next, for a sample exhibiting the type I adsorption isotherm, the pore diameter distribution was analyzed on the adsorption isotherm by using software Autosorb 1 with reference to a kernel calculated by density functional theory (DFT method) assuming a slit type pore. Subsequently, for a sample exhibiting the type IV adsorption isotherm, the pore diameter distribution was analyzed by applying Barrett-Joyner-Halenda method (BJH method) to respective adsorption isotherms. FIG. 16A represents pore diameter distributions of Example 1 to Example 5, FIG. 16B represents pore diameter distributions of Comparative example 1 to Comparative example 3, FIG. 16C represents pore diameter distributions of Comparative example 4 to Comparative example 8, FIG. 16D represents a pore diameter distribution of Comparative example 9, and FIG. 16E represents pore diameter distributions of Comparative example 10 and Comparative example 11. Further, the pore diameter d of the carbon material was calculated by fitting the pore diameter distribution by a Gaussian function.

[Surface Twist t]

For samples of Example 1 to Example 5 and Comparative example 4 to Comparative example 8, the surface twist t was calculated by Equation (3) below by using the pore diameter d and the average particle diameter do of the template nanoparticles described above. Note that, for Comparative example 7, the surface twist t before the hot press step was performed was calculated.

$$t = 4\pi r_0^2 / 4\pi r^2 = d_0^2 / d^2 \qquad (3)$$

Properties of the carbon materials of Example 1 to Example 5 and Comparative example 1 to Comparative example 11 are summarized in Table 1.

TABLE 1

| | Bulk modulus K [GPa] | Graphene network surface size L [nm] | Average stack number n [—] | Pore diameter d [nm] | Surface twist t [—] | Edge site amount $N_{edge}$ [μmol/g] | Edge site specific surface area $S_{edge}$ [m²/g] | Specific surface area S [m²/g] | Pore volume Vtoral [cm³/g] | Template particle diameter $d_0$ [nm] |
|---|---|---|---|---|---|---|---|---|---|---|
| Example 1 | 0.018 | 313 | 1.4 | 7.4 | 3.6 | 131 | 7 | 1906 | 4.1 | 14 |
| Example 2 | 0.417 | 176 | 1.4 | 5.7 | 1.5 | 232 | 12 | 1892 | 2.61 | 7 |
| Example 3 | 0.636 | 309 | 1.4 | 5.7 | 1.5 | 133 | 7 | 1863 | 2.79 | 7 |
| Example 4 | 0.315 | 276 | 1.2 | 6 | 1.8 | 148 | 7 | 2194 | 3.49 | 8 |
| Example 5 | 0.055 | 421 | 1.4 | 11.8 | 6.4 | 97 | 5 | 1935 | 3.5 | 30 |
| Comparative example 1 | 0.412 | 3 | 1 | 1.3 | 1 | 12426 | 621 | 3345 | 1.68 | — |
| Comparative example 2 | 0.408 | 2 | 1.5 | 1.3 | 1 | 18645 | 932 | 2715 | 1.32 | — |
| Comparative example 3 | 0.166 | 2 | 1.6 | 1.3 | 1 | 23575 | 1178 | 2835 | 1.76 | — |
| Comparative example 4 | 0.006 | 13 | 1.3 | 8 | 3.1 | 3261 | 163 | 2213 | 5.15 | 14 |
| Comparative example 5 | 0.085 | 8 | 1.6 | 5 | 2 | 5212 | 260 | 1855 | 3.2 | 7 |
| Comparative example 6 | 0.092 | 11 | 1.5 | 6.3 | 1.6 | 3780 | 189 | 1886 | 3.5 | 8 |
| Comparative example 7 | 0.141 | 10 | 1.8 | 2.3 | 1.6 | 4170 | 208 | 1679 | 1.64 | 8 |
| Comparative example 8 | 0.245 | 4 | 2.3 | 7.1 | 1.3 | 10603 | 530 | 1660 | 2.32 | 8 |
| Comparative example 9 | 2.483 | 65 | 1 | 3 | 1 | 633 | 32 | 1176 | 2.88 | — |
| Comparative example 10 | 0.793 | 9 | 1.1 | 1.3 | 1 | 4481 | 224 | 2679 | 1.76 | — |
| Comparative example 11 | 1.592 | 6 | 1.9 | 0.5 | 1 | 6585 | 329 | 1734 | 0.74 | — |

It was confirmed that the surface twists t of Examples 1 to 5 and Comparative examples 4 to 8 were affected by the average particle diameter do and the average number of stacking layers n of template nanoparticles and were larger for a larger average particle diameter do and a smaller average number of stacking layers n. This is considered to be because those having the structural property described above are likely to be affected by capillary contraction when the template is removed in the separation step. The same template was used in Example 1 and Comparative example 4, Example 2 and 3 and Comparative example 5, and Example 4 and Comparative example 6 to Comparative example 8. In comparison between the Example (GMS) and the Comparative example (CMS) using the same template, the Examples having a larger graphene domain size L exhibit a larger bulk modulus K, and a larger graphene domain size L results in a continuous structure having a smaller edge site amount $N_{edges}$, which exhibits a durable structural property.

In the carbon material, a larger pore diameter d will result in a smaller the curvature of a graphene sheet. Further, a larger surface twist t will result in that the carbon material more exhibits a distorted structure, force is less likely to be uniformly applied thereto, and the carbon material is more likely to be deformed. It is therefore considered that a larger pore diameter d and a larger surface twist t will result in a higher mechanical flexibility and a smaller value of the bulk modulus K.

In comparison between Comparative example 6 and Comparative example 8, it was confirmed that Comparative example 8 having a higher nitrogen dope concentration has a larger bulk modulus K, and the carbon material having a higher nitrogen dope concentration in the graphene domain is harder. This is considered to be because carbon-nitrogen double bond energy is higher than carbon-carbon double bond energy and, thus, the plane network of six-membered ring having ensured planarity is likely to be maintained.

Figure 17:
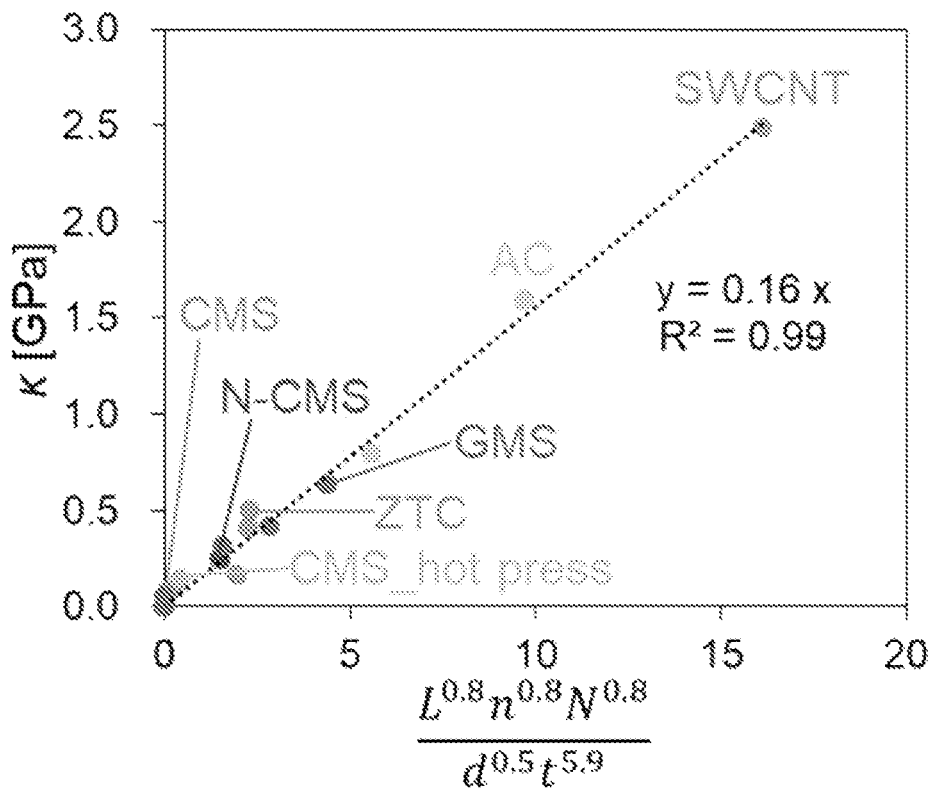
FIG. 17 is a graph illustrating the relationship between bulk modulus K and the structural property of Example 1 to Example 5 and Comparative example 1 to Comparative example 11.
Figure 18A:
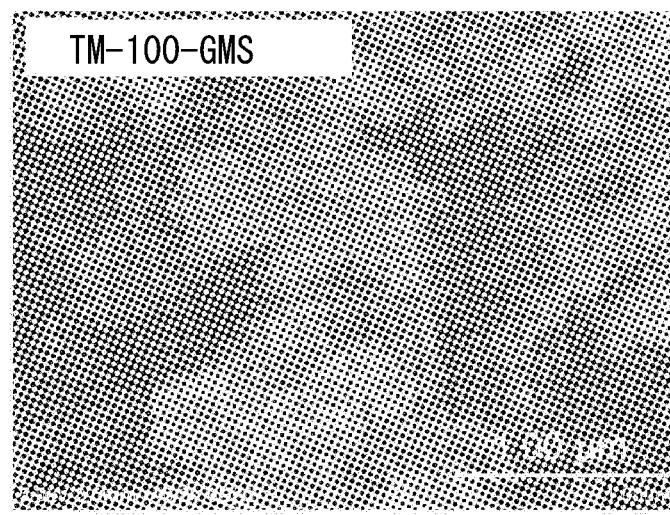
FIG. 18A is a SEM image of Example 1.
Figure 18B:
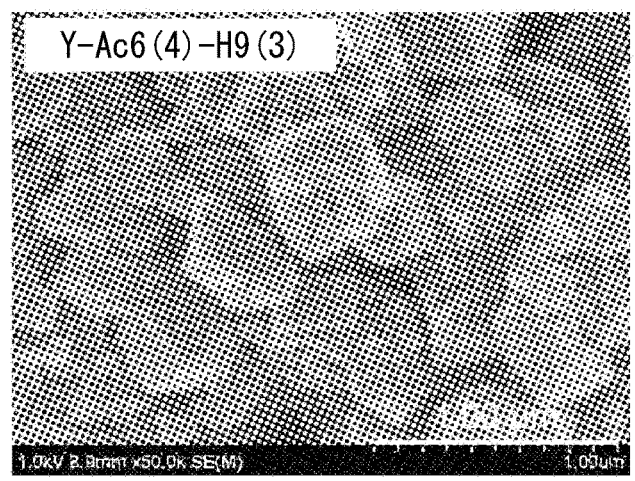
FIG. 18B is a SEM image of Comparative example 2.
Figure 18C:
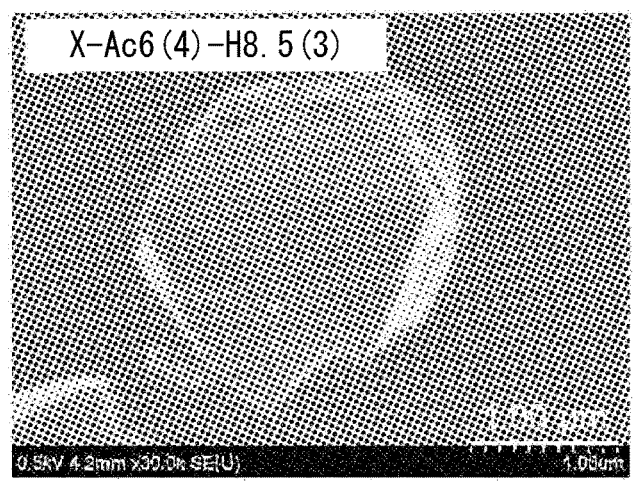
FIG. 18C is a SEM image of Comparative example 3.
Figure 18D:
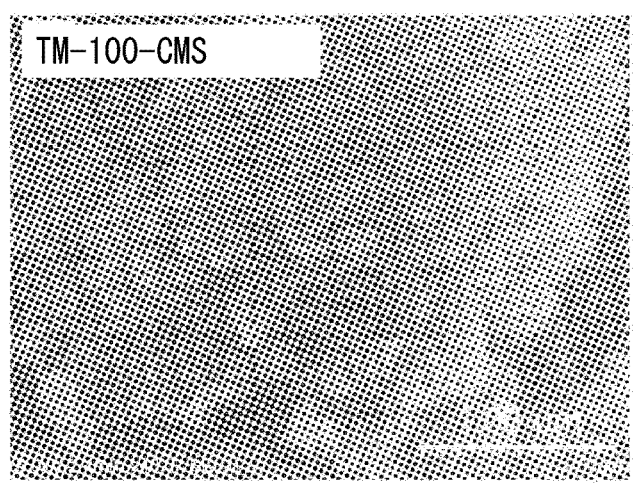
FIG. 18D is a SEM image of Comparative example 4.

FIG. 17 is a graph illustrating the relationship between bulk modulus K and the structural property of Example 1 to Example 5 and Comparative example 1 to Comparative example 11. In FIG. 17, the vertical axis represents the bulk modulus K measured by a mercury intrusion method, and the horizontal axis represents the structural property of the carbon material indicated by Equation (9) below. In FIG. 17, indexes have been optimized so that a linear relationship between the bulk modulus and Equation (9) below is obtained by a least-squares method.

$$(L^{0.8} \times n^{0.8} \times N^{0.8})/(d^{0.5} \times t^{5.9}) \quad (9)$$

As illustrated in FIG. 17, the bulk modulus K of the carbon material is in a proportional relationship with the structural property of the carbon material indicated by Equation (9) above. That is, the bulk modulus K is approximated with Equation (10) below. In the equation, α is a proportional constant, and α=0.16 in the graph illustrated in FIG. 17.

$$K = \alpha \times (L^{0.8} \times n^{0.8} \times N^{0.8})/(d^{0.5} \times t^{5.9}) \quad (10)$$

Therefore, it is effective to adjust the manufacturing condition so that the carbon material has a desired structural property prior to or during fabrication of the carbon material as the adjustment step based on the proportional relationship. Note that the proportional relationship described above is met not only in the carbon materials of the Examples but also the carbon materials in the Comparative examples, and it is effective to adjust the manufacturing condition based on Equation (10) above so that activated carbon, SWCNT, ZTC, or CMS has a desired structural property, for example.

[SEM Observation]

FIG. 18A, FIG. 18B, FIG. 18C, and FIG. 18D are SEM images of Example 1, Comparative example 2, Comparative example 3, and Comparative example 4, respectively. In Example 1 and Comparative example 4 with a smaller surface twist t, no wrinkle due to shape distortion was observed. In experimental data with a large surface twist t (not illustrated), however, a wrinkle due to shape distortion may be observed.

[Raman Spectroscopy Measurement]

Figure 19:
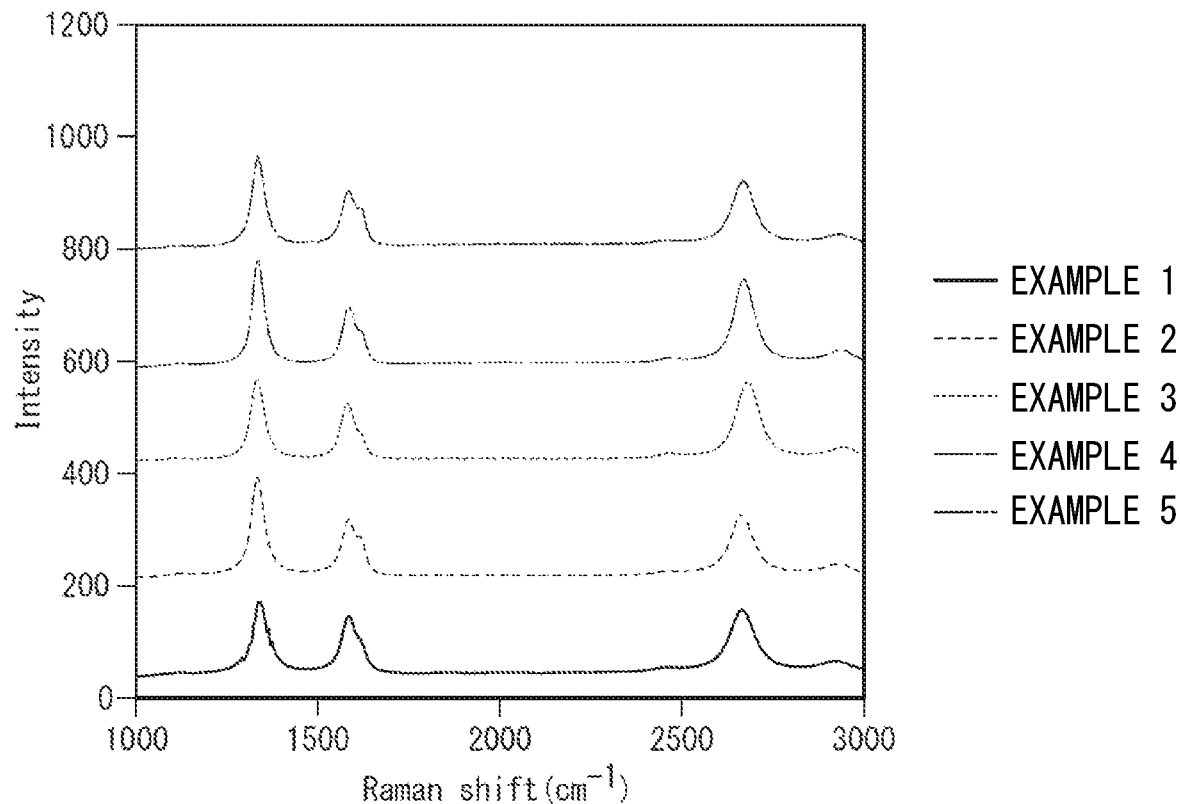
FIG. 19 represents Raman spectra of Example 1 to Example 5.

For the carbon materials of Example 1 to Example 5, the Raman spectra were measured by a microscopic Raman device (LabRAM HR-800, HORIBA, Ltd.). For measurement, laser at 532 nm was used, and the filter was set to DI and the hole was set to 100 μm to perform the measurement. The measurement range was 300 to 3500 cm$^{-1}$. FIG. 19 represents the Raman spectra of Example 1 to Example 5. In FIG. 19, the horizontal axis represents Raman shift (cm$^{-1}$), and the vertical axis represents intensity (a. u.). In FIG. 19, the intensity increases in the order of the graphs of Example 1, Example 2, Example 3, Example 5, and Example 4.

In any of Examples 1 to 5, it was confirmed that there is a D band or a D' band derived from a defect such as a non-hexagonal moiety including an edge site, a G band derived from the skeletal vibration of the graphene sheet, and a 2D band due to secondary phonon scattering. The D band appears as hexagonal breathing mode at a portion where the hexagonal symmetry of the graphene domain is broken. The peaks of the Raman spectra of Example 1 to Example 5 are the peaks of the D band, the G band, the D' band, and the 2D band in the order from the smallest of the Raman shift (cm$^{-1}$). The D' band corresponds to a hexagonal variable angle mode and is prohibited on an infinitely wide hexagonal domain. Therefore, it was also observed from the Raman spectra that the carbon materials of Example 1 to Example 5 also have a graphene framework. Further, in any of Examples 1 to 5, the 2D peak is on the lower phase side compared to the 2D peak of HOPG, and can be fitted with a single Lorentz function, and in Example 1 to Example 5, a single layer graphene was grown.

Next, Examples of the power storage device according to the present embodiment, specifically, Examples of a coin-type lithium battery that is an example of the power storage device will be described.

Example 6

<Fabrication of Cathode>

To fabricate cathode paste, 93% by weight of lithium cobalt oxide (LiCoO$_2$) powder with an average particle diameter of 3 μm, 2% by weight of acetylene black as a conductive agent, and 5% by weight of PVdF were mixed and stirred to become uniform by using N-methyl-pyrrolidone (NMP) as a solvent. The obtained paste was applied onto an aluminum foil with a thickness of 20 μm and dried. This was punched out to a diameter of 14 mm, and was then pressed to obtain a cathode.

<Fabrication of Anode>

To fabricate anode paste, 97% by weight of artificial graphite, 1% by weight of the carbon material of Example 1 described above as a conductive agent, 1% by weight of carboxymethyl cellulose, and 1% by weight of styrene-butadiene rubber (SBR) were mixed and stirred to become uniform by using distilled water as a solvent. The obtained paste was applied onto a copper foil with a thickness of 20 μm and dried. This was punched out to a diameter of 15 mm, and was then pressed to obtain an anode.

<Preparation of Nonaqueous Electrolyte Solution>

Lithium hexafluorophosphate (LiPF$_6$) was added to and dissolved in a mixture solvent in which ethylene carbonate (EC) and dimethyl carbonate (DMC) were adjusted at 3:7 by volume so that the electrolyte concentration became 13% by weight to obtain an electrolyte solution.

<Coin-Type Battery Assembly>

To fabricate a coin-type battery, a polypropylene microporous membrane stretched on one axis was interposed between the cathode and the anode described above, the electrolyte solution described above was added thereto by a specified amount, the cathode, the anode, and the electrolyte solution were accommodated in an exterior component of a 2032-type coin-type battery (height of 3.2 mm, diameter of 20 mm) together with metal spring and spacer, and a seal gasket was crimped to seal the external component.

Example 7

A coin-type battery was fabricated by the same method as in Example 6 except for the use of the carbon material of Example 3 described above as the conductive agent of the anode.

Example 8

A coin-type battery was fabricated by the same method as in Example 6 except for the use of a cathode with 94% by weight of lithium cobalt oxide ($LiCoO_2$) powder with an average particle diameter of 3 μm, 1% by weight of the carbon material of Example 1 described above as the conductive agent, and 5% by weight of PVdF and for the use of 1% by weight of acetylene black as the conductive agent of the anode.

Example 9

A coin-type battery was fabricated by the same method as in Example 8 except for the use of the carbon material of Example 1 described above as the cathode conductive agent and the anode conductive agent, respectively.

Example 10

A coin-type battery was fabricated by the same method as in Example 9 except for the use of, for the cathode, 94.5% by weight of lithium cobalt oxide ($LiCoO_2$) powder and 0.5% by weight of the carbon material of Example 1 described above as the cathode conductive agent.

Example 11

A coin-type battery was fabricated by the same method as in Example 9 except for the use of, for the cathode, 94.8% by weight of lithium cobalt oxide ($LiCoO_2$) powder and 0.2% by weight of the carbon material of Example 1 described above as the cathode conductive agent.

Example 12

A coin-type battery was fabricated by the same method as in Example 9 except for the use of, for the anode, 97.4% by weight of artificial graphite and 0.6% by weight of the carbon material of Example 1 described above as the anode conductive agent.

Example 13

A coin-type battery was fabricated by the same method as in Example 9 except for the use of, for the anode, 97.9% by weight of artificial graphite and 0.1% by weight of the carbon material of Example 1 described above as the anode conductive agent.

Example 14

A coin-type battery was fabricated by the same method as in Example 9 except for the use of, for the anode, 97.97% by weight of artificial graphite and 0.03% by weight of the carbon material of Example 1 described above as the anode conductive agent.

Comparative Example 12

A coin-type battery was fabricated by the same method as in Example 6 except for the use of acetylene black as the conductive agent of the anode.

Comparative Example 13

A coin-type battery was fabricated by the same method as in Example 6 except for the use of the carbon material of Comparative example 1 as the conductive agent of the anode.

Comparative Example 14

A coin-type battery was fabricated by the same method as in Example 6 except for the use of the carbon material of Comparative example 9 as the conductive agent of the anode.

Comparative Example 15

A coin-type battery was fabricated by the same method as in Example 9 except for the use of the carbon material of Comparative example 1 as the conductive agent of the cathode and the anode.

Comparative Example 16

A coin-type battery was fabricated by the same method as in Comparative example 12 except for the use of, for the cathode, 93.5% by weight of lithium cobalt oxide ($LiCoO_2$) powder and 1.5% by weight of acetylene black as the cathode conductive agent

Comparative Example 17

A coin-type battery was fabricated by the same method as in Comparative example 12 except for the use of, for the cathode, 94.5% by weight of lithium cobalt oxide ($LiCoO_2$) powder and 0.5% by weight of acetylene black as the cathode conductive agent.

Comparative Example 18

A coin-type battery was fabricated by the same method as in Comparative example 12 except for the use of, for the cathode, 94.8% by weight of lithium cobalt oxide ($LiCoO_2$) powder and 0.2% by weight of acetylene black as the cathode conductive agent.

Comparative Example 19

A coin-type battery was fabricated by the same method as in Comparative example 12 except for the use of, for the anode, 0.6% by weight of acetylene black as the anode conductive agent.

Comparative Example 20

A coin-type battery was fabricated by the same method as in Comparative example 12 except for the use of, in the anode, 97.9% by weight of artificial graphite and 0.1% by weight of acetylene black as the anode conductive agent.

Comparative Example 21

A coin-type battery was fabricated by the same method as in Comparative example 12 except for the use of, in the anode, 97.97% by weight of artificial graphite and 0.03% by weight of acetylene black as the anode conductive agent.

The coin-type batteries fabricated in Examples 6 to 14 and Comparative examples 12 to 21 were charged to 4.35 V at constant current of 2.0 mA at 0° C. and then discharged to 3.0 V at constant current of 2.0 mA at 0° C. Then, charging/discharging was repeated 10 times in the same manner, and the discharge capacity retention rate was measured. The results are presented in Table 2.

voltage during charging, less lithium charge capacity than a design standard, and a small burden on the anode.

Figure 21:
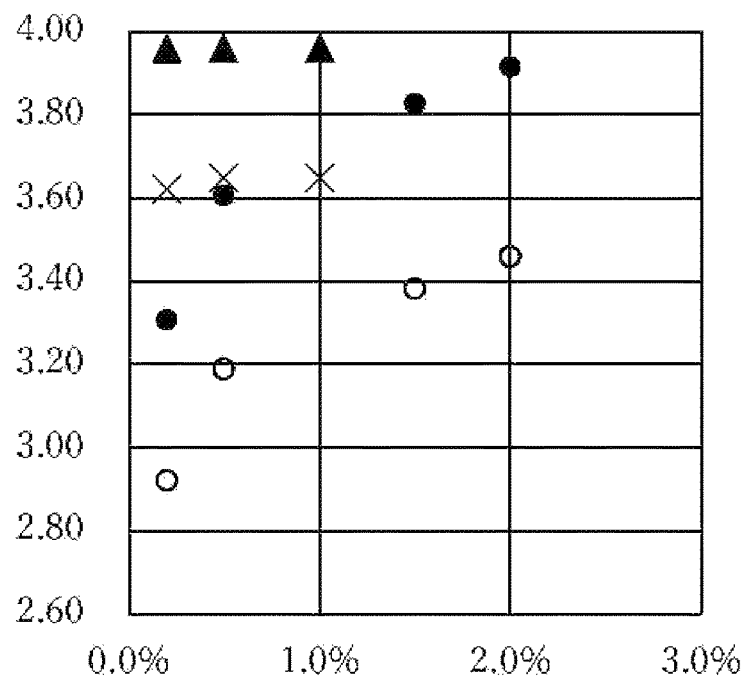
FIG. 21 is a diagram illustrating comparison between Examples and Comparative examples for the relationship between the addition amount (wt %) of a conductive agent and the charge/discharge capacity (mAh) in the cathode.

FIG. 21 is a diagram illustrating comparison between the Examples and the Comparative examples for the relationship between the addition amount (wt %) of a conductive agent in the cathode and the charge/discharge capacity (mAh) for the coin-type batteries fabricated in Examples 6 to 14 and Comparative examples 12 to 21. The horizontal axis represents the addition amount of a conductive agent, the vertical axis represents the capacity, each black triangle represents the charge capacity in the Examples, each cross represents the discharge capacity in the Examples, each white circle represents the charge capacity in the Comparative examples, and each black circle represents the discharge capacity in the Comparative examples.

TABLE 2

| | Cathode conductive aid | Addition amount/ wt % | Anode conductive aid | Addition amount/ wt % | Charge capacity/ mAh | Discharge capacity/ mAh | Initial charge/discharge efficiency | 10-cycle retention rate |
|---|---|---|---|---|---|---|---|---|
| Example 6 | Acetylene black | 2.00% | Carbon material of Example 1 | 1.0% | 3.916 | 3.609 | 92.2% | 95.0% |
| Example 7 | Acetylene black | 2.00% | Carbon material of Example 3 | 1.0% | 3.916 | 3.646 | 93.1% | 96.9% |
| Example 8 | Carbon material of Example 1 | 1.00% | Acetylene black | 1.0% | 3.960 | 3.499 | 88.4% | 96.1% |
| Example 9 | Carbon material of Example 1 | 1.00% | Carbon material of Example 1 | 1.0% | 3.960 | 3.649 | 92.2% | 98.0% |
| Example 10 | Carbon material of Example 1 | 0.50% | Carbon material of Example 1 | 1.0% | 3.961 | 3.650 | 92.2% | 97.8% |
| Example 11 | Carbon material of Example 1 | 0.20% | Carbon material of Example 1 | 1.0% | 3.959 | 3.622 | 91.5% | 97.9% |
| Example 12 | Carbon material of Example 1 | 1.00% | Carbon material of Example 1 | 0.6% | 3.962 | 3.651 | 92.4% | 97.0% |
| Example 13 | Carbon material of Example 1 | 1.00% | Carbon material of Example 1 | 0.1% | 3.957 | 3.646 | 92.3% | 94.4% |
| Example 14 | Carbon material of Example 1 | 1.00% | Carbon material of Example 1 | 0.03% | 3.963 | 3.652 | 92.5% | 92.8% |
| Comparative example 12 | Acetylene black | 2.00% | Acetylene black | 1.0% | 3.916 | 3.460 | 88.4% | 90.1% |
| Comparative example 13 | Acetylene black | 2.00% | Carbon material of Comparative example 1 | 1.0% | 3.915 | 3.347 | 85.5% | 88.1% |
| Comparative example 14 | Acetylene black | 2.00% | Carbon material of Comparative example 9 | 1.0% | 3.918 | 3.275 | 83.6% | 89.2% |
| Comparative example 15 | Carbon material of Comparative example 1 | 1.00% | Carbon material of Comparative example 1 | 1.0% | 3.740 | 3.198 | 85.5% | 94.2% |
| Comparative example 16 | Acetylene black | 1.50% | Acetylene black | 1.0% | 3.828 | 3.382 | 76.9% | 87.9% |
| Comparative example 17 | Acetylene black | 0.50% | Acetylene black | 1.0% | 3.608 | 3.188 | 72.5% | 86.2% |
| Comparative example 18 | Acetylene black | 0.20% | Acetylene black | 1.0% | 3.307 | 2.622 | 66.4% | 83.9% |
| Comparative example 19 | Acetylene black | 2.00% | Acetylene black | 0.6% | 3.915 | 3.459 | 88.4% | 78.3% |
| Comparative example 20 | Acetylene black | 2.00% | Acetylene black | 0.1% | 3.915 | 3.459 | 88.4% | 73.8% |
| Comparative example 21 | Acetylene black | 2.00% | Acetylene black | 0.03% | 3.918 | 3.462 | 88.4% | 67.6% |

When the carbon material of the present embodiment was used as the conductive agent of the cathode, the battery cycle characteristics were improved despite the test at a low temperature. It is inferred that this is because of low overvoltage during charging, less lithium charge capacity than a design standard, and a small burden on the anode.

Figure 22:
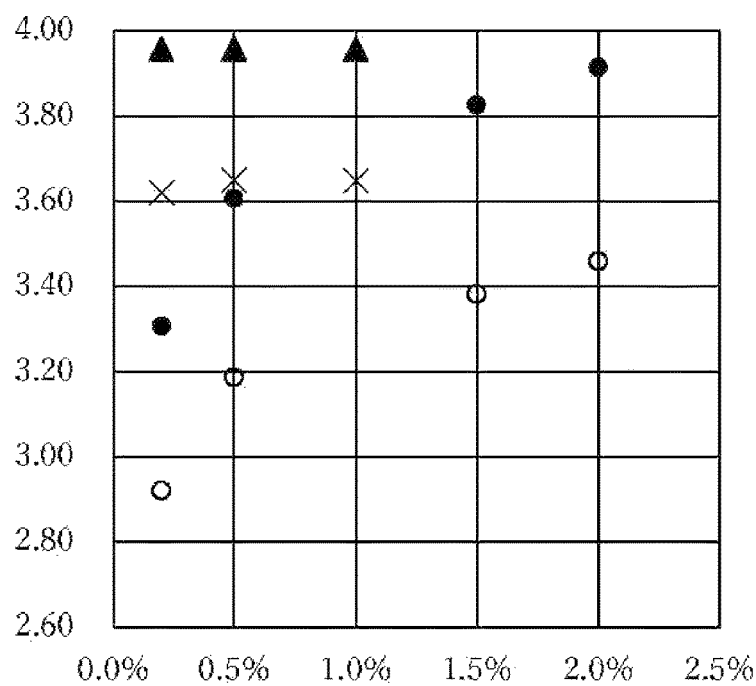
FIG. 22 is a diagram illustrating comparison between Examples and Comparative examples for the relationship between the addition amount (wt %) of the conductive agent and the charge/discharge capacity (mAh) in the anode.

Further, when the carbon material of the present embodiment was used as the conductive agent of the anode, the initial loss capacity in the anode was smaller than in the Comparative examples, the initial efficiency was improved, and the initial discharge capacity was high. The battery cycle characteristics were improved despite the test at a low temperature. It is inferred that this is because of low over- FIG. 22 is a diagram illustrating comparison between the Examples and the Comparative examples for the relationship between the addition amount (wt %) of a conductive agent in the anode and the charge/discharge capacity (mAh) for the coin-type batteries fabricated in Examples 6 to 14 and Comparative examples 12 to 21. The horizontal axis represents the addition amount of a conductive agent, the vertical axis represents the capacity, each black triangle represents the charge capacity in the Examples, each cross represents the discharge capacity in the Examples, each white circle represents the charge capacity in the Comparative examples, and each black circle represents the discharge capacity in the Comparative examples.

The higher the cathode potential is, the higher the capacity is. Thus, typically, charging is performed at a constant voltage in order to control the capacity to a designed value. Herein, (1) when the cathode has a high resistance, the cathode itself will have a high potential and a high charging capacity, (2) when the anode has high resistance, the relationship of (battery voltage)=(cathode potential)−(anode electrode potential) is established, so the anode high resistance causes anode overvoltage, and thus the cathode potential will become high and the charging capacity will become high.

Discharging is performed until a certain end-point voltage is reached, and a high electrode resistance causes the voltage to fall below the end-point voltage early because of voltage reduction due to overvoltage, which results in a low capacity. As a result, the state of the charge/discharge capacity is reflected to the charge/discharge efficiency. Obviously, the higher the efficiency is, the less the loss of a battery capacity is, which is preferable. It is found from FIG. 21 and FIG. 22 that the Examples exhibit a high discharge capacity by a smaller addition amount of the conductive agent. Namely, the Examples have a higher cathode material content per electrode, and have a higher capacity per electrode than the Comparative examples.

Figure 23:
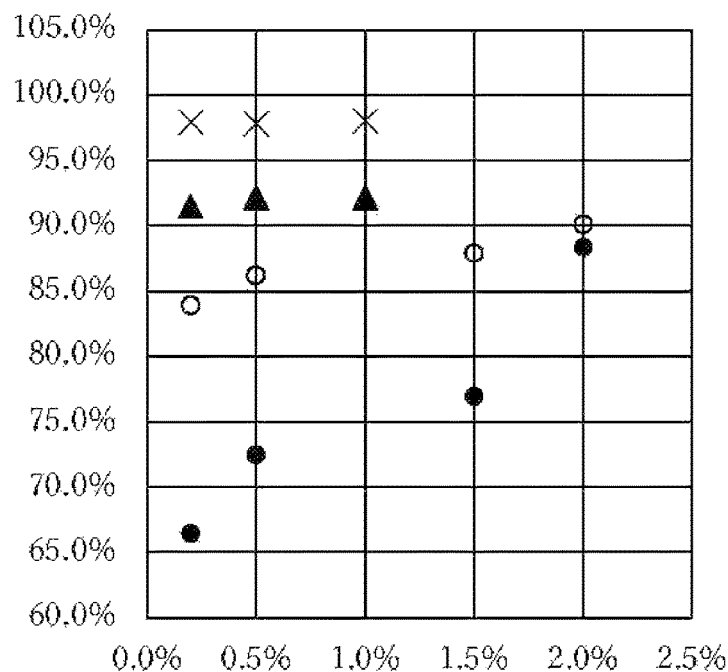
FIG. 23 is a diagram illustrating comparison between Examples and Comparative examples for the relationship between the addition amount of the conductive agent and the initial efficiency and the relationship between the addition amount of the conductive agent and the 10-cycle retention rate in the cathode.

FIG. 23 is a diagram illustrating comparison between the Examples and the Comparative examples for the relationship between the addition amount of the conductive agent in the cathode and the initial efficiency and the relationship between the addition amount of the conductive agent in the cathode and the 10-cycle retention rate for the coin-type batteries fabricated in Examples 6 to 14 and Comparative examples 12 to 21. Each black triangle represents the initial efficiency in Examples, each cross represents the 10-cycle retention rate in the Examples, each white circle represents the initial efficiency in the Comparative examples, and each black circle represents the 10-cycle retention rate in the Comparative examples.

Figure 24:
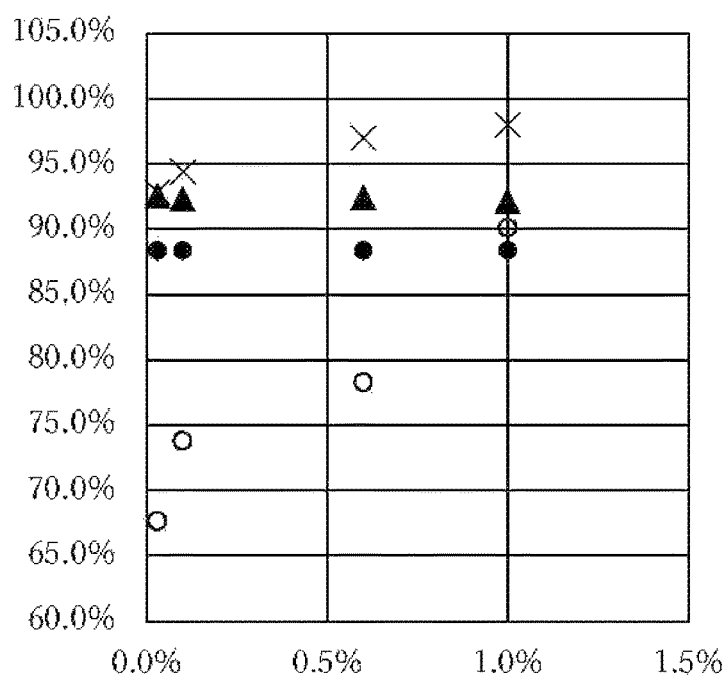
FIG. 24 is a diagram illustrating comparison between Examples and Comparative examples for the relationship between the addition amount of the conductive agent and the initial efficiency and the relationship between the addition amount of the conductive agent and the 10-cycle retention rate in the anode.

FIG. 24 is a diagram illustrating comparison between the Examples and the Comparative examples for the relationship between the addition amount of the conductive agent in the anode and the initial efficiency and the relationship between the addition amount of the conductive agent in the anode and the 10-cycle retention rate for the coin-type batteries fabricated in Examples 6 to 14 and Comparative examples 12 to 21. Each black triangle represents the initial efficiency in the Examples, each cross represents the 10-cycle retention rate in the Examples, each white circle represents the initial efficiency in the Comparative examples, and each black circle represents the 10-cycle retention rate in the Comparative examples.

The state of the charge/discharge capacity is reflected to the charge/discharge efficiency. Obviously, the higher the efficiency is, the less the loss of a battery capacity is, which is preferable. Furthermore, the amount of the loss of the battery capacity corresponds to the amount of the capacity consumed by the side reaction, and the film generated by the side reaction causes an increase in resistance. When the cycle is repeated, the initial loss of battery capacity does not occur, but another side reaction occurs when the potential rises above the normal reaction potential due to an overvoltage of the electrode. The side reaction causes the film formation repeatedly, and the resistance further increases. As a result, deterioration of the battery is promoted in rapid succession, and thus decreasing of cycle retention rate continues.

It can be seen from FIG. 23 and FIG. 24 that the Examples exhibit high efficiency or a high retention rate with a smaller addition amount of the conductive agent than the Comparative examples. It is therefore inferred that the conductive agent of the present embodiment can reduce the electrode resistance, suppress accumulation of side reaction due to repetition of cycles, and maintain a high capacity even with repetition of cycles.

REFERENCE SIGNS LIST 1 graphene sheet
10 graphene framework
11 carbon layer
12 carbon layer
30 molding
50 molding
100 carbon material
200 power storage device (lithium-ion battery)
211 exterior component
212 cathode
213 exterior component
214 anode
215 separator
217 seal gasket
218 spring
219 spacer

The invention claimed is:

1. A carbon material having a graphene framework consisting of a plurality of graphene sheets and a three-dimensional porous structure,
   wherein the carbon material has a bulk modulus K that is less than or equal to 2 GPa, and
   wherein the three-dimensional porous structure comprises at least one carbon layer and an average number of stacking layers n calculated by equation (2) is greater than one and six or less:

$$n = \frac{S_{graphene}}{S - S_{edge}} = \frac{S_{graphene}}{S_{basal}} \tag{2}$$

wherein S denotes a specific surface area of the carbon material, $S_{graphene}$ denotes a graphene theoretical specific surface area (2627 m²/g), Sedge denotes an edge site specific surface area, and $S_{basal}$ denotes a basal specific surface area.

2. The carbon material according to claim 1, wherein the carbon material has pore structures, and a pore diameter d is greater than or equal to 5 nm and less than or equal to 65 nm.

3. The carbon material according to claim 1, wherein a nitrogen content N in graphene domain is greater than or equal to 0 wt % and less than or equal to 10 wt %.

4. The carbon material according to claim 1, wherein a BET specific surface area S is greater than or equal to 400 m²/g and less than or equal to 2600 m²/g.

5. The carbon material according to claim 1, wherein the edge site amount $N_{edge}$ is less than or equal to 500 μmol/g.

6. The carbon material according to claim 1, wherein the edge site specific surface area Sedge is less than or equal to 30 m²/g.

7. The carbon material according to claim 1, wherein the carbon material has pore structures, and a pore volume $V_{total}$ is greater than or equal to 1.9 cm³/g and less than or equal to 5 cm³/g.

8. An anode for a power storage device comprising
the carbon material according to claim 1, and
a metal foil,
wherein the anode contains the carbon material in an amount of 0.03 wt % or higher.

9. A cathode for a power storage device comprising
the carbon material according to claim 1, and
a metal foil,
wherein the cathode contains the carbon material in an amount of 0.03 wt % or higher.

10. A power storage device comprising
a cathode and/or an anode including the carbon material according to claim 1 and a metal foil, and
a separator,
wherein the cathode and/or the anode contains the carbon material in an amount of 0.03 wt % or higher.

* * * * *